(12) United States Patent (10) Patent No.: US 8,744,340 B2
Palanki et al. (45) Date of Patent: Jun. 3, 2014

(54) METHOD AND APPARATUS OF OBTAINING TIMING IN A REPEATER

(75) Inventors: Ravi Palanki, San Jose, CA (US);
Dhananjay Ashok Gore, Karnataka (IN); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 13/187,273

(22) Filed: Jul. 20, 2011

(65) Prior Publication Data

US 2012/0063492 A1 Mar. 15, 2012

Related U.S. Application Data

(60) Provisional application No. 61/382,383, filed on Sep. 13, 2010.

(51) Int. Cl.
*H04B 3/36* (2006.01)

(52) U.S. Cl.
USPC .............................................. 455/7; 375/211

(58) Field of Classification Search
USPC ............. 455/7, 11.1, 13.1, 115.1, 67.11, 126, 455/135, 164.1, 25, 266, 277.1, 296, 422.1, 455/428, 433, 434, 436, 450, 456.1, 501, 455/522, 69, 63.1, 67.14; 370/208, 210, 370/204, 241, 252, 257, 315, 328, 329, 335, 370/342, 441, 509, 524, 491, 516, 338; 375/130, 134, 137, 136, 140, 208, 295, 375/142, 216, 260, 147–150, 211, 214, 223, 375/224, 232, 240, 259, 267, 285, 296, 301, 375/303, 324, 326, 340, 342, 343, 346, 354, 375/355, 375
See application file for complete search history.

(56) References Cited

U.S. PATENT DOCUMENTS

| 7,088,953 | B2 | 8/2006 | Bongfeldt |
| 7,480,486 | B1 | 1/2009 | Oh et al. |
| 7,710,913 | B2 | 5/2010 | Kilfoyle et al. |
| 2005/0136835 | A1 | 6/2005 | Suwa |
| 2006/0128399 | A1 | 6/2006 | Duan et al. |

(Continued)

FOREIGN PATENT DOCUMENTS

| EP | 1566900 A2 | 8/2005 |
| JP | 2006-505146 A | 2/2008 |

(Continued)

OTHER PUBLICATIONS

Partial International Search Report—PCT/US2011/044822—ISA/EPO—Nov. 16, 2011.

(Continued)

*Primary Examiner* — Edward Urban
*Assistant Examiner* — Golam Sorowar
(74) *Attorney, Agent, or Firm* — Arent Fox LLP

(57) ABSTRACT

Methods and apparatuses are provided that include a mobile station modem (MSM) embedded in a repeater for enhancing repeater functionality. The MSM can determine a timing of a base station based on one or more signals received therefrom. Using the timing, the repeater can align timing to that of the base station, determine cyclic prefix of the received signals, cancel echo from received signals, switch between receiving uplink and downlink signals, transmit PRSs according to the timing, and/or the like.

65 Claims, 15 Drawing Sheets

(56) References Cited

U.S. PATENT DOCUMENTS

| | | | |
|---|---|---|---|
| 2006/0198472 A1* | 9/2006 | Nakamura et al. | 375/343 |
| 2007/0066220 A1* | 3/2007 | Proctor et al. | 455/11.1 |
| 2007/0291668 A1* | 12/2007 | Duan | 370/280 |
| 2008/0025423 A1* | 1/2008 | Wang et al. | 375/260 |
| 2008/0045145 A1 | 2/2008 | Nakatsugawa | |
| 2008/0045148 A1* | 2/2008 | Okuda | 455/18 |
| 2008/0274692 A1 | 11/2008 | Larsson | |
| 2009/0154533 A1* | 6/2009 | Khayrallah et al. | 375/211 |
| 2009/0163224 A1 | 6/2009 | Dean et al. | |
| 2010/0111070 A1* | 5/2010 | Hsu | 370/350 |
| 2010/0167743 A1 | 7/2010 | Palanki et al. | |
| 2010/0167758 A1 | 7/2010 | Mukai et al. | |
| 2010/0246475 A1 | 9/2010 | Naden et al. | |

FOREIGN PATENT DOCUMENTS

| | | |
|---|---|---|
| JP | 2008-48218 A | 2/2008 |
| JP | 2008-177969 A | 7/2008 |
| JP | 2010-147766 A | 7/2010 |
| JP | 2010-151807 A | 7/2010 |
| WO | WO9524783 A1 | 9/1995 |
| WO | WO02087275 | 10/2002 |
| WO | WO 03/044970 A2 | 5/2003 |
| WO | WO2007098313 A2 | 8/2007 |
| WO | WO2008155744 A2 | 12/2008 |
| WO | WO2009078768 A1 | 6/2009 |
| WO | WO 2010/007274 A1 | 1/2010 |
| WO | WO2010095851 A2 | 8/2010 |

OTHER PUBLICATIONS

International Search Report and Written Opinion—PCT/US2011/044822—ISA/EPO—Mar. 14, 2012.

Yusuke Asai et al., A Study on Amplify-and-Foward Cooperative Transmission Systems Using Noise Power Estimation, the Institute of Electronics, Information and Communication Engineers, IEICE Technical Report dated May 2008, pp. 7-12.

* cited by examiner

METHOD AND APPARATUS OF OBTAINING TIMING IN A REPEATER

CLAIM OF PRIORITY UNDER 35 U.S.C. §119

The present application for patent claims priority to Provisional Application No. 61/382,383, entitled METHOD AND APPARATUS FOR UTILIZING EMBEDDED MOBILE STATION MODEM TIMING IN REPEATERS, filed Sep. 13, 2010, assigned to the assignee hereof and hereby expressly incorporated by reference herein.

BACKGROUND

1. Field

The following description relates generally to wireless network communications, and more particularly to repeaters.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

In addition, repeaters can be used in some wireless communication systems to expand base station coverage by receiving one or more signals over a receive antenna, amplifying the one or more signals, and retransmitting the one or more amplified signals over a transmit antenna. The use of repeaters can result in some issues, however, in wireless network operation. In one example, signals transmitted by a repeater can result in echo to signals received by the repeater from the base station in a similar time period.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with obtaining timing of a base station for retransmitting signals from the base station. In one example, a mobile station modem (MSM) embedded within, or otherwise associated with, a repeater can be used to obtain timing of a base station from which signals are received at the repeater. For example, the repeater can provide the signals, as amplified and/or received, to the MSM. In another example, the repeater can cease transmitting signals to allow the MSM to receive signals from the base station. In either case, the MSM can decode information blocks from the signals, estimate a channel of the signals, and/or the like, to determine the timing. Using the timing, for example, the repeater can more accurately perform echo cancellation for signals retransmitted by the repeater from signals received from the base station. In another example, using the timing, the repeater can determine a time period during which to receive, amplify, and/or retransmit uplink signals to the base station. In yet another example, based at least in part on the timing, the repeater can refrain from retransmitting positioning reference signals (PRS), transmit PRSs for a base station at a similar timing as the base station, transmit a distinct PRS that does not interfere with the base station's PRS, etc., allowing devices to perform more accurate positioning.

According to an example, a method for wireless communication is provided that includes receiving one or more signals from one or more base stations and obtaining a timing of the one or more base stations based at least in part on the one or more signals. The method also includes retransmitting the one or more signals based at least in part on the timing of the one or more base stations.

In another aspect, an apparatus for utilizing base station timing for retransmitting signals is provided. The apparatus includes at least one processor configured to obtain one or more signals from one or more base stations and determine a timing of the one or more base stations based at least in part on the one or more signals. The at least one processor is further configured to retransmit the one or more signals based at least in part on the timing of the one or more base stations. The apparatus also includes a memory coupled to the at least one processor.

In yet another aspect, an apparatus for retransmitting signals based on base station timing is provided that includes means for receiving one or more signals from one or more base stations and means for obtaining a timing of the one or more base stations based at least in part on the one or more signals. The apparatus further includes means for retransmitting the one or more signals based at least in part on the timing of the one or more base stations.

Still, in another aspect, a computer-program product for utilizing base station timing for retransmitting signals is provided including a computer-readable medium having code for causing at least one computer to obtain one or more signals from one or more base stations and code for causing the at least one computer to determine a timing of the one or more base stations based at least in part on the one or more signals. The computer-readable medium further includes code for causing the at least one computer to retransmit the one or more signals based at least in part on the timing of the one or more base stations.

Moreover, in an aspect, an apparatus for retransmitting signals based on base station timing is provided that includes a receiving component for receiving one or more signals from one or more base stations and a searching component for obtaining a timing of the one or more base stations based at least in part on the one or more signals. The apparatus further includes a retransmitting component for retransmitting the one or more signals based at least in part on the timing of the one or more base stations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
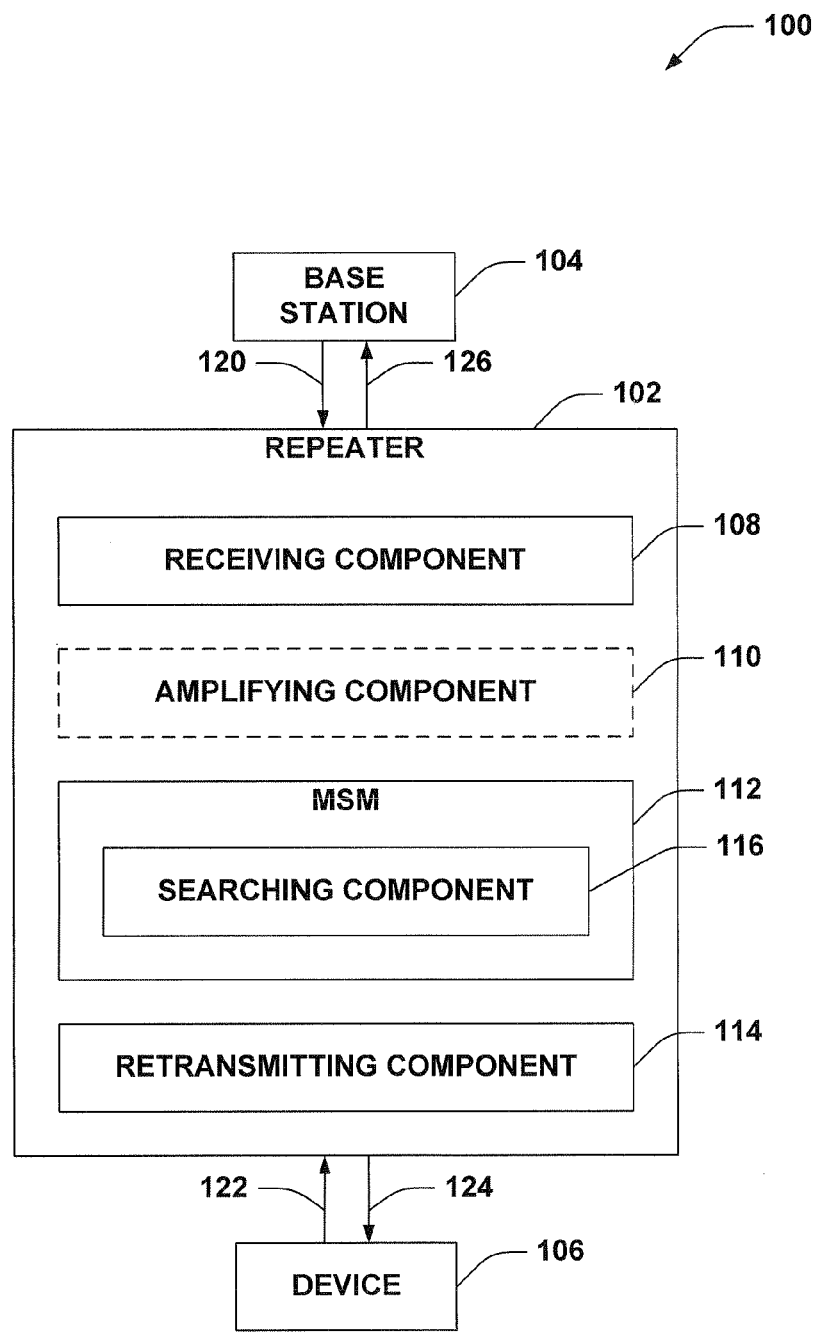
FIG. 1 is a block diagram of an aspect of a system that facilitates retransmitting received signals based on determining timing of a base station.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, timing of one or more base stations can be obtained at a repeater based at least in part on one or more received (e.g., and/or amplified) signals. In an example, signals from the base station can be provided to or received by a modem, e.g., a mobile station modem (MSM), in the repeater. The MSM, for example, can decode information blocks, estimate a channel, etc., of the signals to obtain the timing. For example, the repeater can utilize the timing to perform echo cancellation of signals transmitted by the repeater that interfere with signals received from the one or more base stations. In another example, the repeater can utilize the timing to determine a time period for receiving, amplifying, and/or retransmitting an uplink transmission and/ or a downlink transmission. Moreover, for example, the repeater can utilize the timing to determine when a positioning reference signal (PRS) or other reference/location related signal is transmitted from the one or more base stations, and can refrain from retransmitting an amplified PRS, transmit the PRS without delay, transmit a distinct PRS that does not interfere with the PRS of the one or more base stations, etc.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, an example wireless communication system 100 is illustrated that obtains base station timing at a repeater. System 100 comprises a repeater 102 that retransmits signals from one or more base stations, such as base station 104, to one or more devices, such as device 106, and/or vice versa. For example, base station 104 can be a macrocell, femtocell, picocell, or similar base station, a mobile base station, a relay node, a device (e.g., communicating in peer-to-peer or ad-hoc mode with device 106), a portion thereof, and/or the like. Device 106 can be a UE, modem (or other tethered device), a portion thereof, and/or the like. For example, repeater 102 can communicate with base station 104 at least in part by receiving signals therefrom over a wired or wireless backhaul link, and can retransmit the signals over a wireless access link (e.g., to one or more devices, such as device 106) to provide expanded coverage area of base station 104, improve signal-to-noise (SNR) of base station to device 106 or one or more other devices, and/or the like. In another example, repeater 102 can additionally or alternatively retransmit communications from device 106 to base station 104, for example to improve signal quality thereof.

Repeater 102 can comprise a receiving component 108 for obtaining one or more signals from one or more base stations or devices, such as signals 120 and/or 122, and an optional amplifying component 110 for applying amplification to the one or more signals as received. Repeater 102 can additionally comprise an MSM 112 for communicating with one or more components of a wireless network (not shown) (e.g., via base station 104), and a retransmitting component 114 that retransmits the one or more signals obtained from the one or more base stations or devices, such as signals 124 and/or 126. In addition, the MSM 112 can comprise a searching component 116 at least for obtaining timing information related to one or more base stations or devices based at least in part on the one or more signals received therefrom.

According to an example, base station 104 can transmit a signal, and receiving component 108 can obtain the signal (e.g., via one or more antennas). In one example, amplifying component 110 can amplify the signal. Receiving component 108 or amplifying component 110 can then provide the signal as received or as amplified to MSM 112. In one example, retransmitting component 114 can cease retransmission over a time period to allow MSM 112 to acquire the signal of base station 104 without echo caused by retransmitting component 114. MSM 112 can be typically provided at a repeater 102 for communicating with an operations, administration, maintenance (OAM) server or similar component of a wireless network to receive configuration parameters for the repeater, such as which frequencies to amplify in which regions, an allowed gain, and/or the like. For example, MSM 112 can be a UE, or at least a portion thereof, in a corresponding wireless communications system, and thus can be equipped to process signals from a base station. In this regard, searching component 116 can obtain information regarding base station 104 based at least in part on processing the received signal.

For example, searching component 116 can obtain information such as a timing related to signal transmission at base station 104 at least in part by decoding information blocks in the signal, which can indicate timing, estimating a channel in the signal (e.g., using a fast Fourier transform (FFT), inverse FFT (IFFT), etc., based channel estimation), and/or the like. In this regard, the MSM 112 and corresponding searching component 116 can perform typical functions of a UE in a wireless network, in one example. The determined timing of base station 104 can correspond to or otherwise facilitate aligning a communication frame to certain time or time period at the base station 104. The communication frames, for example, can be or can include subframes over which base station 104 transmits signals in an orthogonal frequency division multiplexing (OFDM) configuration. Thus, in one example, the timing alignment can relate to alignment of one or more subframe boundaries to an absolute or relative time (e.g., in milliseconds), and can thus facilitate retrieval of one or more data symbols. In addition, searching component 116 can similarly obtain other information of the base station 104, and/or the like.

In this regard, for example, the repeater 102 can utilize the base station 104 information acquired by MSM 112 to optimize repeater functionality. For example, as described further herein, repeater 102 can perform echo cancelling based at least in part on the determined timing of base station 104. In another example, repeater 102 can utilize the timing to determine times for switching between receiving, amplifying, and/or retransmitting uplink and downlink signals. Moreover, for example, repeater 102 can utilize the timing of base station 104 for avoiding retransmitting PRSs of base station 104, retransmitting PRSs in a similar time period, transmitting distinct PRSs that do not interfere with PRSs of base station 104, and/or the like. Moreover, it is to be appreciated that receiving component 108 and/or amplifying component 110 can provide the signal to retransmitting component 114 for retransmitting in the wireless network, and device 106 can receive the retransmitted signal from repeater 102 and/or the signal transmitted from base station 104.

Figure 2:
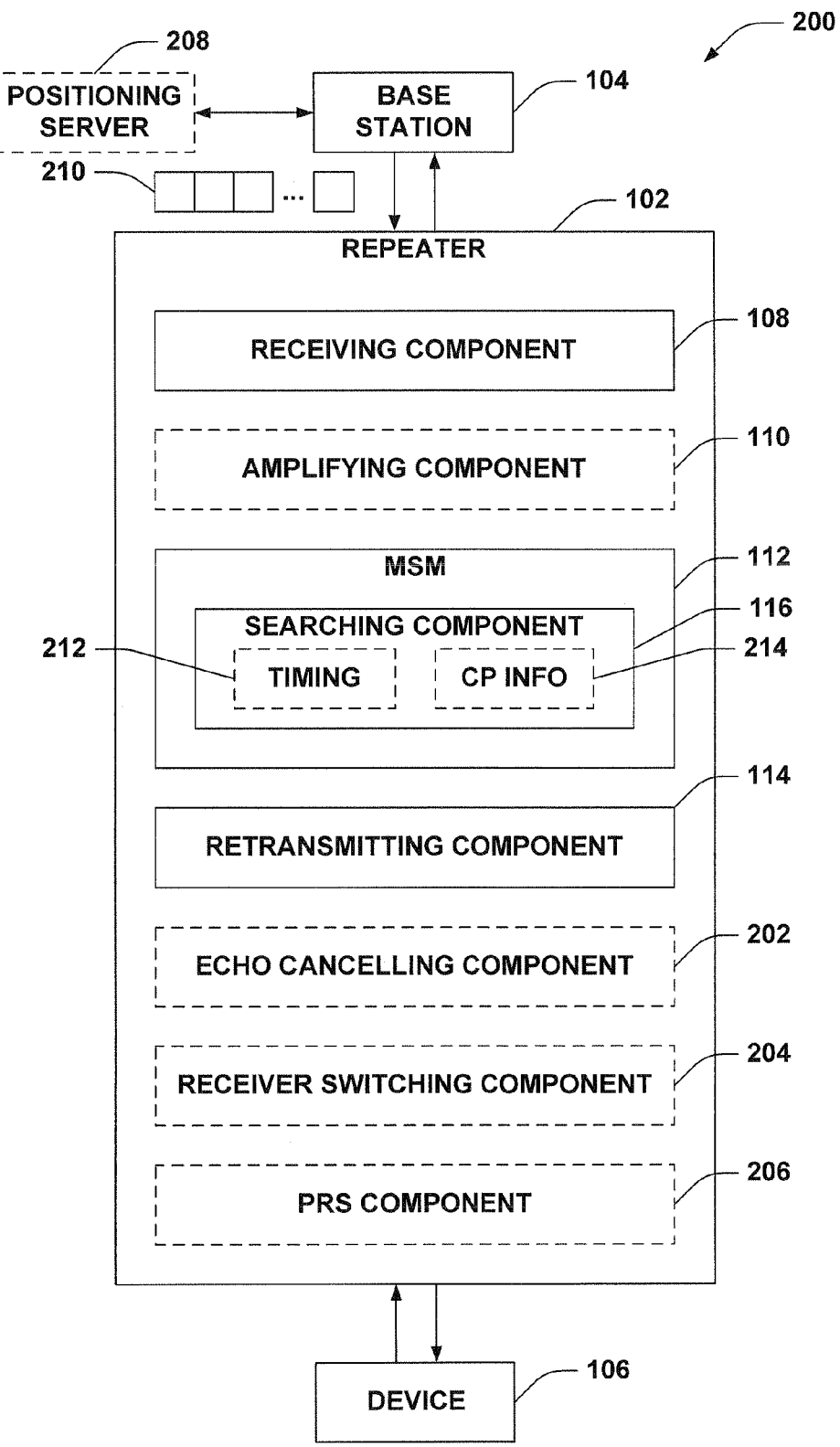
FIG. 2 is a block diagram of an aspect of a system for providing enhanced repeater functionality based on determining timing of a base station.

Turning to FIG. 2, an example wireless communication system 200 is illustrated that facilitates utilizing base station timing. System 200 comprises a repeater 102 that retransmits signals from one or more base stations, such as base station 104, to one or more devices, such as device 106, and/or vice versa, as described. In an alternative, a positioning server 208 can be utilized to store positioning information regarding base station 104, such as location (e.g., absolute or relative), PRS transmission intervals, etc. For example, the positioning server 208 can be a serving mobile location center (SMLC), evolved SMLC (eSMLC), etc. Moreover, though depicted as a direct communication link, it is to be appreciated that base station 104 can communicate with positioning server 208 via one or more additional core network components.

Repeater 102 can comprise a receiving component 108 for obtaining one or more signals from one or more base stations or devices, and an optional amplifying component 110 for applying amplification to the one or more signals as received. Repeater 102 can additionally comprise an MSM 112 for communicating with one or more components of a wireless network (not shown) (e.g., via base station 104), and a retransmitting component 114 that retransmits the one or more signals obtained from the one or more base stations or devices. Moreover, repeater 102 can optionally comprise an echo cancelling component 202 for removing echo caused by retransmitting component 114 from signals received by receiving component 108, a receiver switching component 204 for selecting whether to receive downlink or uplink signals at receiving component 108 for retransmission, and/or a PRS component 206 for determining whether to transmit and/or retransmit one or more PRSs or other reference/location signals. In addition, the MSM 112 can comprise a searching component 116 for obtaining information related to one or more base stations or devices based at least in part on the one or more signals received therefrom.

According to an example, receiving component 108 can receive a signal transmitted by base station 104. In an example, amplifying component 110 can amplify the signal and provide the amplified signal to MSM 112 (e.g., and/or receiving component 108 can provide the signal as received to MSM 112). In another example, MSM 112 can receive the signal directly from base station 104. The signal, for example, can represent one or more modulated symbols 210. For example, these can include OFDM or similar symbols. In either case, searching component 116 can obtain information regarding base station 104 from the signal, such as a timing 212 acquired by estimating a channel of the signal based on one or more pilot signals, cyclic prefix information 214 from one or more system information blocks represented in one or more symbols 210 decoded from the signals, and/or the like. Retransmitting component 114 can additionally retransmit the signal as received from receiving component 108 and/or amplified by amplifying component 110, as described, to provide repeater functionality.

In addition, however, repeater 102 can perform additional functionality based at least in part on the timing 212, cyclic prefix information 214, and/or other information obtained from the signal regarding base station 104. For example, echo cancelling component 202 can align an FFT block structure of repeater 102 (e.g., as related to one or more subframes) with that of the received signal based at least in part on the timing 212 of base station 104 obtained from MSM 112. Thus, for example, MSM 112 aligns the FFT block structure to the signal based on the determined timing (e.g., time at which the signal is transmitted by base station 104), which allows for more accurate estimation of a channel of the signal to obtain corresponding data symbols represented by the signal. In addition, in this regard, echo cancelling component 202 can remove a cyclic prefix from the signal based at least in part on the cyclic prefix information 214 obtained from MSM 112. Thus, echo cancelling component 202 can cancel, from the signal, a previous signal retransmitted at the time the signal was received from base station 104 (e.g., based on the aligned FFT block) to remove echo from the received signal caused by the retransmitted signal.

For example, MSM 112 aligning the FFT block structure allows for maintaining orthogonality of the signals, and echo cancelling component 202 can therefore subtract the retransmitted signal from the signal, after removing the cyclic prefix, based on the FFT block structure alignment to yield the signal transmitted by base station 104. Moreover, in an example, echo cancelling component 202 can remove echo from the received signal, and amplifying component 110 can amplify the echo cancelled signal. In either case, retransmitting component 114 can retransmit the signal with echo removed. In another example, echo cancelling component 202 can utilize the cyclic prefix and/or timing information for cancelling echo from subsequent signals received from base station 104 at receiving component 108. In one example, echo cancelled signals, in this regard, can be provided to the MSM 112 for determining timing and/or other information of base station 104.

In another example, receiver switching component 204 determines when to receive downlink signals from base station 104 or uplink signals from device 106 at receiving component 108 for retransmission by retransmitting component 114 based at least in part on the timing of base station 104 obtained by MSM 112. For example, based at least in part on the timing, receiver switching component 204 can determine when downlink and uplink transmissions occur according to the base station 104 timing (e.g., based on the alignment, as described previously). Thus, receiver switching component 204 can switch receiving component 108 to receive over the backhaul link when downlink signals are scheduled according to the alignment and/or can switch receiving component 108 to receive over the access link when uplink signals are scheduled. In one example, receiver switching component 204 can switch receiving component 108 during guard periods to mitigate impact due to power amplification non-linearity at repeater 102. For example, the guard periods can correspond to one or more subframes or other periods between downlink and uplink transmissions that are not utilized for transmitting in order to mitigate signals leaking into adjacent subframes utilized for transmission. In addition, in an example, retransmitting component 114 can also be switched to retransmit the downlink or uplink signals as received at receiving component 108.

Moreover, in an example, PRS component 206 can utilize timing of base station 104, as obtained by MSM 112, for transmitting PRSs. In one example, MSM 112 can obtain one or more parameters regarding a PRS transmitted by the base station 104 from positioning server 208. For example, the MSM 112 can determine one or more time periods (e.g., subframes) during which base station 104 transmits a PRS from the positioning server 208. In one example, this can include receiving a time interval from the positioning server 208 and determining the time period based at least in part on PRS component 206 detecting a PRS, determining the time period, and applying the time interval to determine one or more subsequent time periods for PRS transmission.

In an example, PRS component 206 can determine that base station 104 transmits a PRS in a certain time period based additionally on the timing information, and can cause retransmitting component 114 to refrain from retransmitting the PRS received from the base station 104 at receiving component 108 during the time period. In this regard, device 106 receiving the PRS can more accurately perform positioning (e.g., using advanced forward link triangulation (AFLT), observed time difference of arrival (OTDOA), or other positioning techniques) based on the location of base station 104 and the signal received directly therefrom, without subsequently receiving the PRS retransmitted from repeater 102. In another example, PRS component 206 can obtain the PRS from base station 104, determine a subsequent time period during which base station 104 will transmit another PRS, and transmit the obtained PRS in the subsequent time period with timing aligned with base station 104. In yet another example, PRS component 206 can generate a PRS specific to repeater 102, which device 106 can utilize to perform AFLT, OTDOA, etc. (e.g., based additionally on the location of repeater 102), and can determine a time period for transmitting the PRS so as not to interfere with a PRS from base station 104. In this example, PRS component 206 can obtain the time period within which base station 104 is to transmit its PRS based at least in part on the information obtained at MSM 112 from positioning server 208.

In another example, the repeater 102 can receive timing advance signals from the base station 104 for incrementally adjusting timing based on that of base station 104 to correct the timing. In this example, the searching component 116 can approximate the timing of the one or more base stations based at least in part on the one or more signals, which can be received at or otherwise provided to MSM 112, as described. In addition, one or more signals received at and processed by the searching component 116 can include timing advance commands. Thus, for example, the searching component 116 can incrementally adjust the determined timing of base station 104 according to the timing advance commands to maintain the timing of base station 104.

Figure 3:
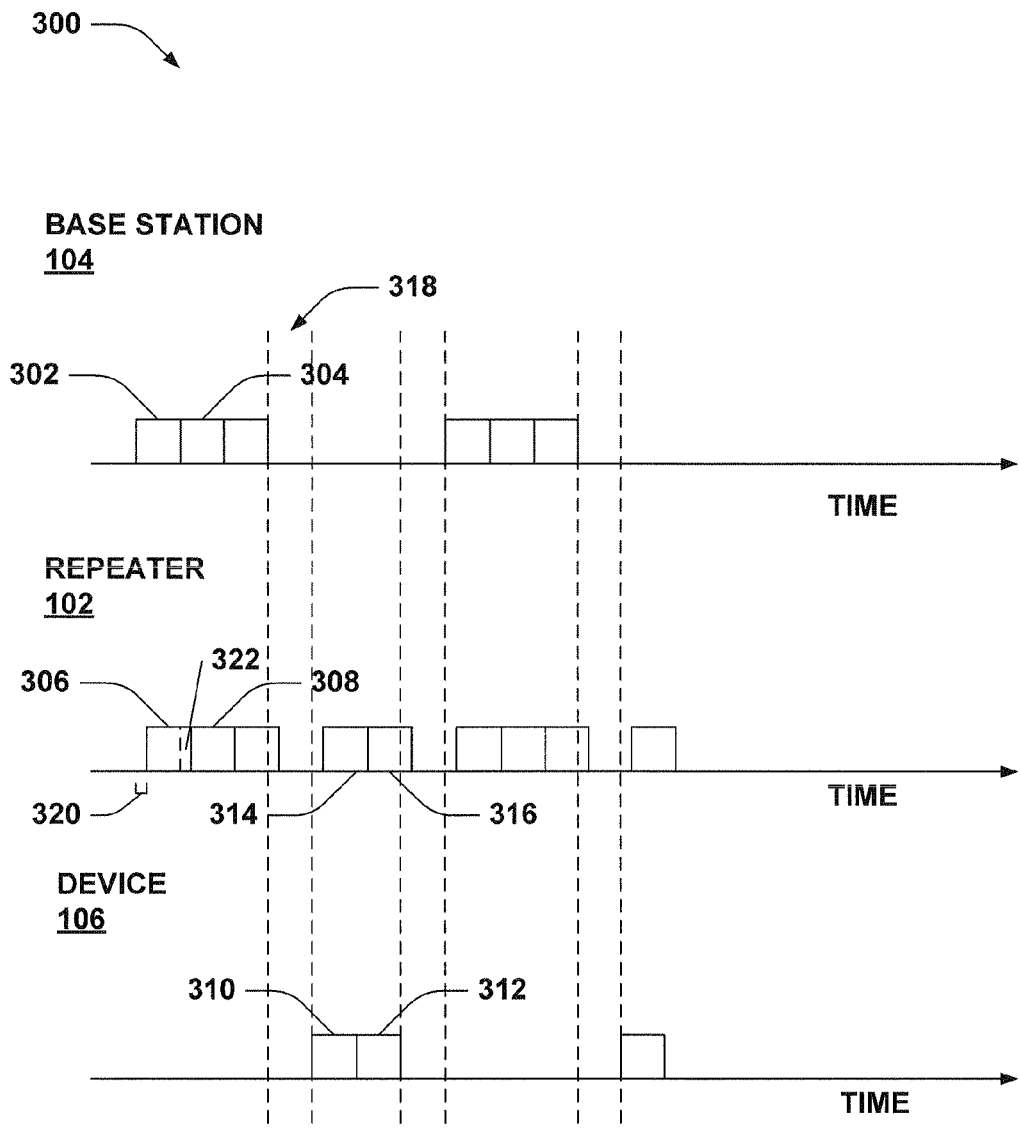
FIG. 3 is a diagram of an example transmission timeline of a base station, repeater, and user equipment.

Referring to FIG. 3, example transmission timelines 300 are illustrated regarding a base station 104, repeater 102, and a device 106. As described, the repeater 102 can retransmit signals received from the base station 104 and/or device 106. Thus, for example, the base station 104 can transmit signals 302, 304, etc., which can correspond to OFDM symbols that are modulated and transmitted as radio signals. The repeater 102 receives signals 302, 304, etc. and retransmits the signals as 306, 308, etc. with some delay 320. For example, the delay 320 can be caused by receiving the signals at a later time than transmitted, processing at least a portion of the signals, and/or the like. In addition, retransmission signal 306 can interfere with receipt of signal 304 since signal 306 is retransmitted over a portion of the time period 322 (e.g., subframe) within which signal 304 is received. As described, the repeater 102 can cancel echo caused by signal 306 from received signal 304.

For example, the repeater 102 can determine a timing of the base station 104 based at least in part on signal 304 (e.g., at least in part by decoding information blocks of signal 304, estimating a channel of signal 304, etc., using an MSM), and can align an FFT block structure with the signal 304. Moreover, in an example, the repeater 102 can remove cyclic prefix from signal 304 using the MSM, which can be determined based at least in part on the one or more information blocks in signal 304. The repeater 102 can then perform FFT/IFFT based channel estimation to acquire the signal 304, and can cancel the signal 306 therefrom to produce the echo cancelled signal 308. The repeater 102 can retransmit the echo cancelled signal 308, which can be received by one or more devices, such as device 106, as described. The repeater 102 can similarly receive signals from device 106, such as signals 310 and 312, and can retransmit the signals as signals 314 and 316 for receipt by the base station 104. In addition, the repeater 102 can similarly obtain a timing of device 106 according to signal 312 and can cancel echo received from retransmitting signal 314 from signal 312.

Moreover, as described, the repeater 102 can switch from receiving signals from the base station 104 for retransmission to receiving signals from the device 106 for retransmission. For example, this can include switching between corresponding resources (e.g., frequency, time, and/or the like). In the depicted example, the base station 104 and device 106 can implement guard subframes 318 during which neither the base station 104 nor the device 106 transmit signals. For example, this can allow signal leakage in the subframe 318 without impacting communications of base station 104 or device 106. In an example, the repeater 102 can determine the guard subframes 318 based on the timing determined from signals 302, 304, 310, 312, etc. (e.g., as the end of one or more subframes), and can switch between receiving signals on the downlink from the base station and signals on the uplink from the device 106 during the guard subframes 318 to mitigate impact of power amplifier non-linearity at the repeater.

Figure 4:
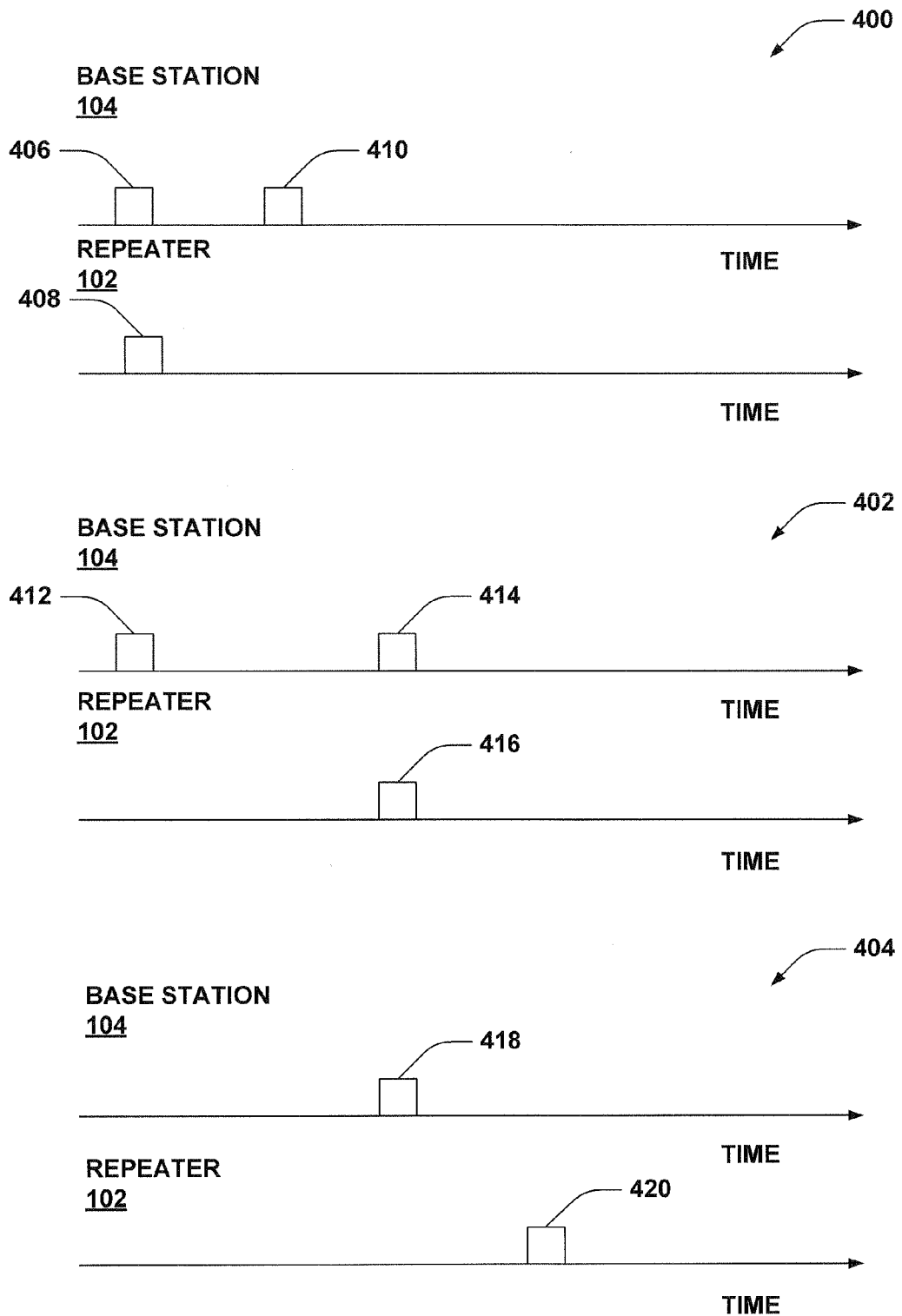
FIG. 4 is a diagram of example transmission timelines for transmitting positioning reference signals (PRS).

Turning to FIG. 4, example transmissions timelines 400, 402, and 404 for transmitting PRSs or other location/reference signals is illustrated. At transmission timeline 400, the base station 104 can transmit a signal 406, which is retransmitted as signal 408 by the repeater 102. In addition, the base station 104 can transmit a PRS 410, which repeater 102 does not retransmit. For example, the repeater 102 can determine signal 410 is a PRS based at least in part on obtaining information indicating subframes during which the base station 104 transmits PRSs (e.g., from an eSMLC, etc.). By avoiding retransmission of PRS 410, the repeater 102 can mitigate confusion caused to one or more devices performing positioning.

In another example, transmission timeline 402 illustrates the repeater 102 transmitting the same PRS as the base station 104. In this example, the repeater 102 can again determine subframes during which the base station 104 transmits PRSs. The repeater 102 can receive PRS 412. Regardless of whether the repeater 102 retransmits PRS 412, the repeater 102 can determine the timing of the base station 104 (e.g., from PRS 412 or other signals received therefrom), as described, and can store the PRS, and/or related parameters. In addition, the repeater 102 can determine a subsequent subframe during which the base station 104 will transmit PRS 414 (e.g., based on eSMLC information). Based on this determination, the repeater 102 can transmit PRS 416 as the received PRS 412 at the subframe where base station 104 transmits PRS 414. For example, the PRSs 412 and 414 can be substantially similar, such that retransmitting PRS 412 as PRS 416 can be similar to transmitting PRS 414 without delay.

In yet another example, transmission timeline 404 illustrates the repeater 102 transmitting a distinct PRS. In this example, the repeater 102 can determine when the base station 104 transmits PRS 418 (e.g., from an eSMLC), and can avoid interference by transmitting a PRS 420 that is specific to repeater 102 at a different subframe.

Referring to FIGS. 5-10, example methodologies relating to determining and utilizing base station timing in providing repeater functionality are illustrated. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 5:
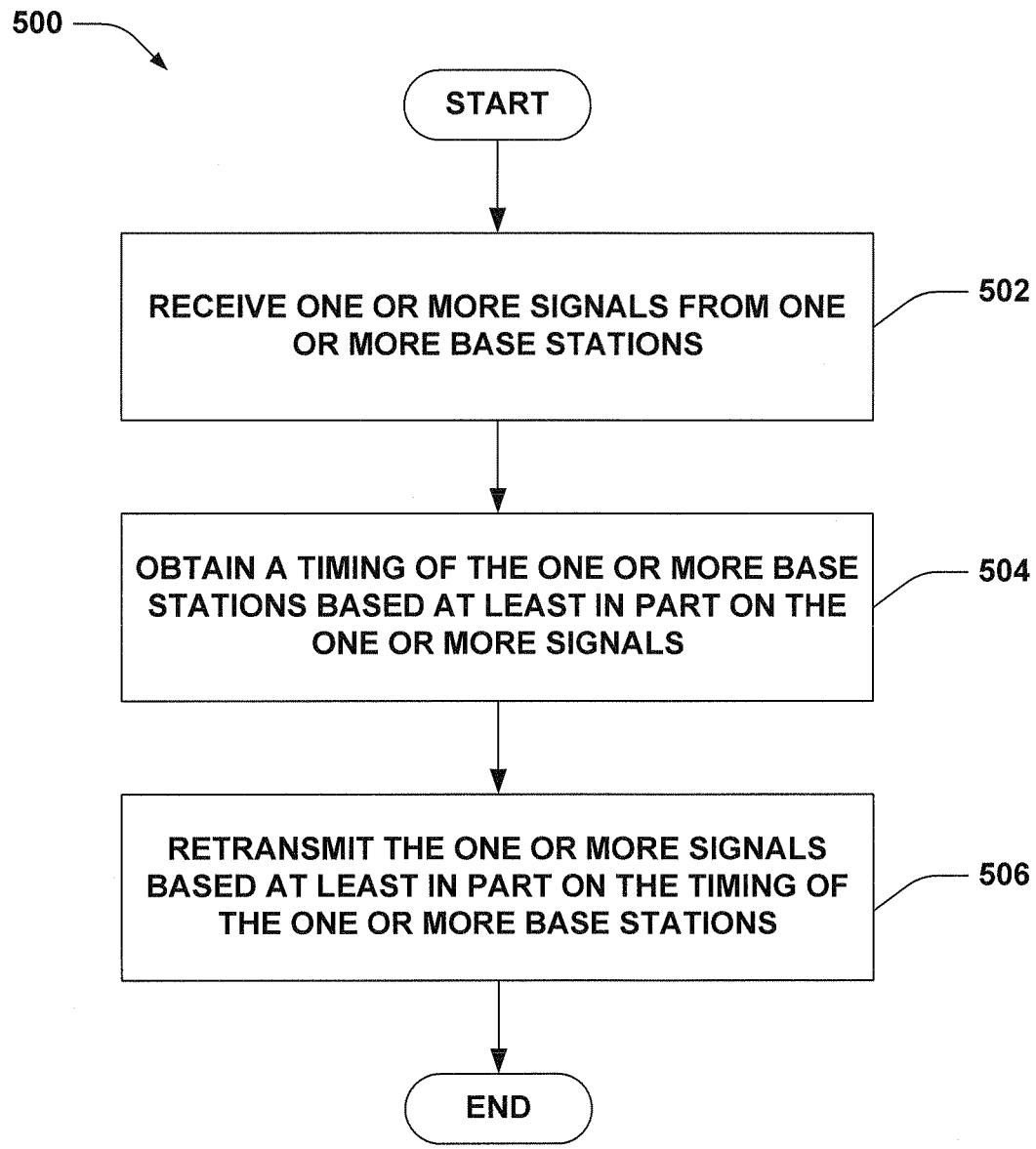
FIG. 5 is a flow chart of an aspect of a methodology that retransmits signals based on a timing of a base station.

Turning to FIG. 5, an example methodology 500 for obtaining and utilizing a timing of a base station is illustrated. At 502, one or more signals can be received from one or more base stations. At 504, a timing of the one or more base stations can be obtained based at least in part on the one or more signals. As described, this can include providing the signals to an embedded MSM to obtain the timing. For example, the embedded MSM can estimate a channel of the signals to determine timing information, retrieve one or more information blocks from the signals, and/or the like. In another example, the one or more signals can be received directly at the MSM (e.g., and retransmissions can be ceased during this period of time). At 506, the one or more signals can be retransmitted based at least in part on the timing of the one or more base stations. For example, timing can be aligned with the determined timing for purposes of echo cancellation for retransmitting signals, switching to receive/retransmit uplink signals, determining a PRS, and/or the like.

Figure 6:
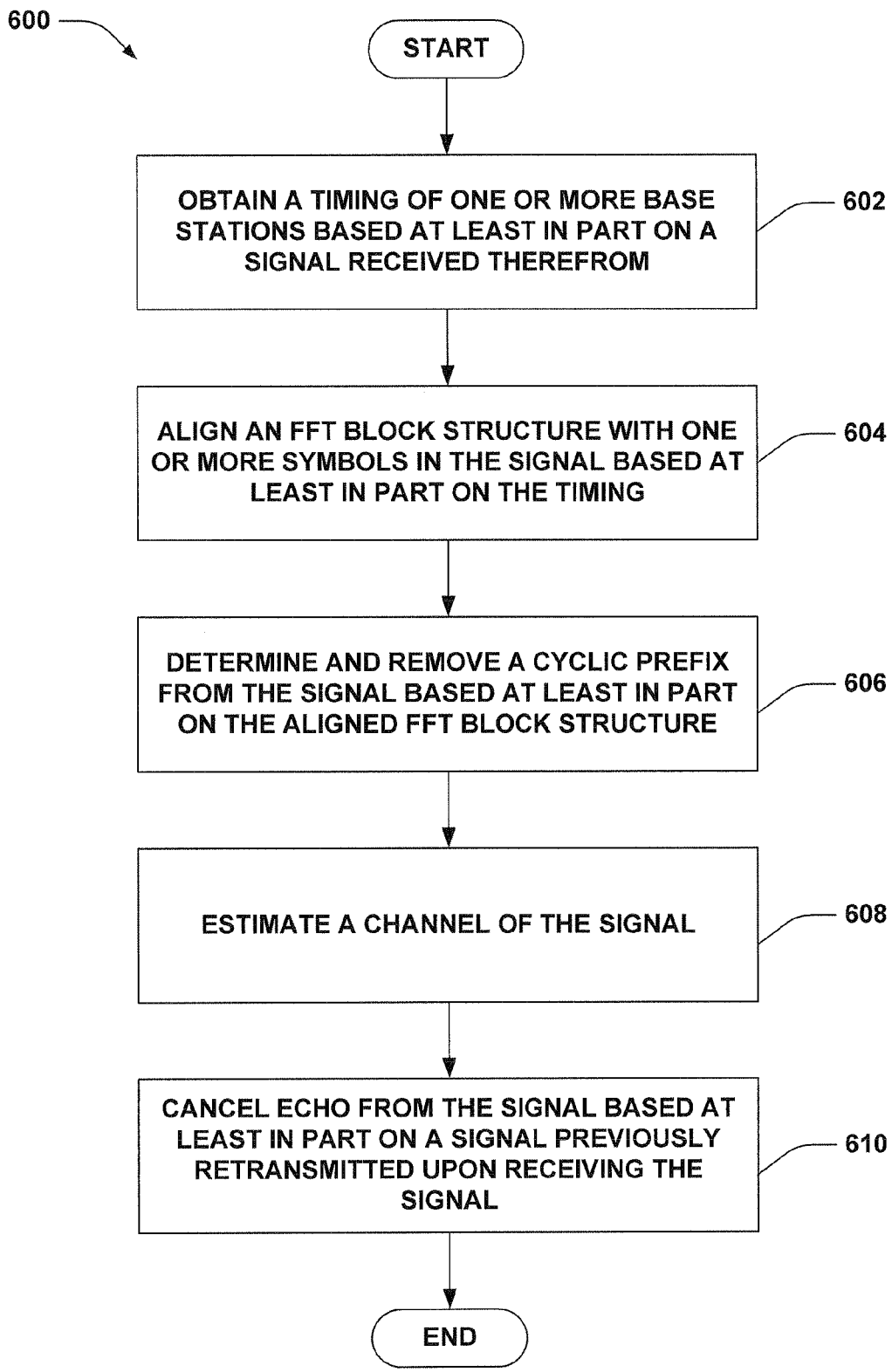
FIG. 6 is a flow chart of an aspect of a methodology for cancelling echo from signals based on a timing of a base station.

Referring to FIG. 6, an example methodology 600 is shown for cancelling echo from signals received from one or more base stations. At 602, a timing of one or more base stations can be obtained based at least in part on a signal received therefrom. As described, this can be performed using an embedded MSM. At 604, an FFT block structure can be aligned with one or more symbols in the signal based at least in part on the timing. Aligning the FFT block structure, for example, can allow processing of the one or more symbols substantially as transmitted from the one or more base stations in the one or more signals. At 606, a cyclic prefix can be determined and removed from the signal based at least in part on the aligned FFT block structure. In one example, the cyclic prefix can be determined from one or more information blocks in the signal. At 608, a channel of the signal can be estimated. The estimation can be an FFT/IFFT based channel estimation performed based on the alignment of the FFT block structure. At 610, echo can be cancelled from the signal based at least in part on a signal previously retransmitted upon receiving the signal. For example, since the FFT block structure is aligned, the orthogonality of the signal is maintained, and thus the previously retransmitted signal can be cancelled from the received signal to yield the signal transmitted from the base station. This signal, for example, can then be amplified and retransmitted, provided to an embedded MSM, and/or the like.

Figure 7:
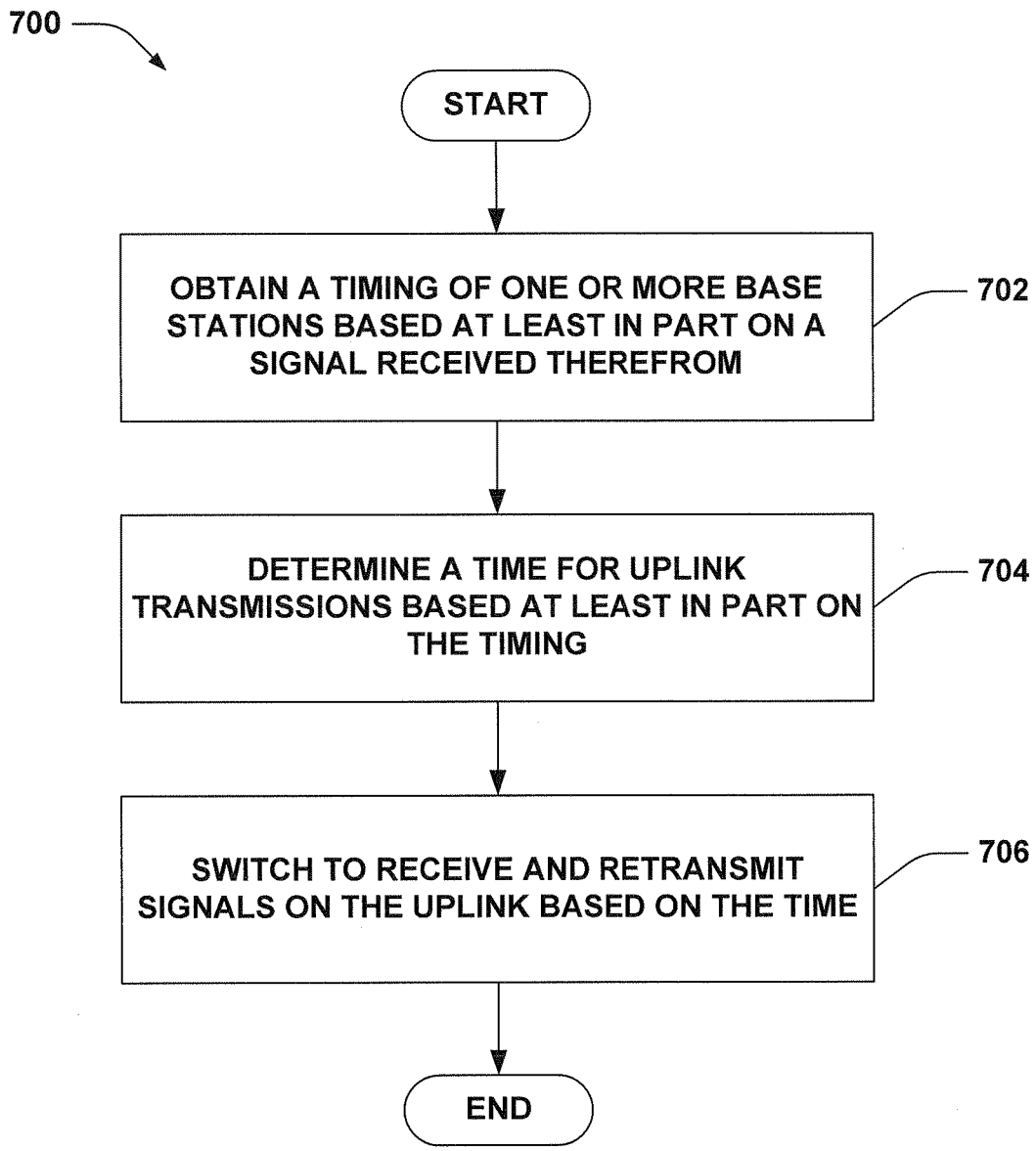
FIG. 7 is a flow chart of an aspect of a methodology for switching to receive uplink or downlink signals based on a timing of a base station.

Turning to FIG. 7, an example methodology 700 is illustrated for switching between receiving and retransmitting uplink and downlink signals. At 702, a timing of one or more base stations can be obtained based at least in part on a signal received therefrom. As described, this can be performed using an embedded MSM. At 704, a time for uplink transmissions can be determined based at least in part on the timing. For example, the time can correspond to a subframe where the base station ceases transmitting to one or more devices and receives signals from the one or more devices. Thus, at 706, switching to receive and retransmit signals on the uplink can occur based on the time. In one example, a guard period can be determined between the time of communicating downlink signals and the time of communicating uplink signals, and the switch can occur during the guard period to mitigate impact due to, e.g., power amplifier non-linearity.

Figure 8:
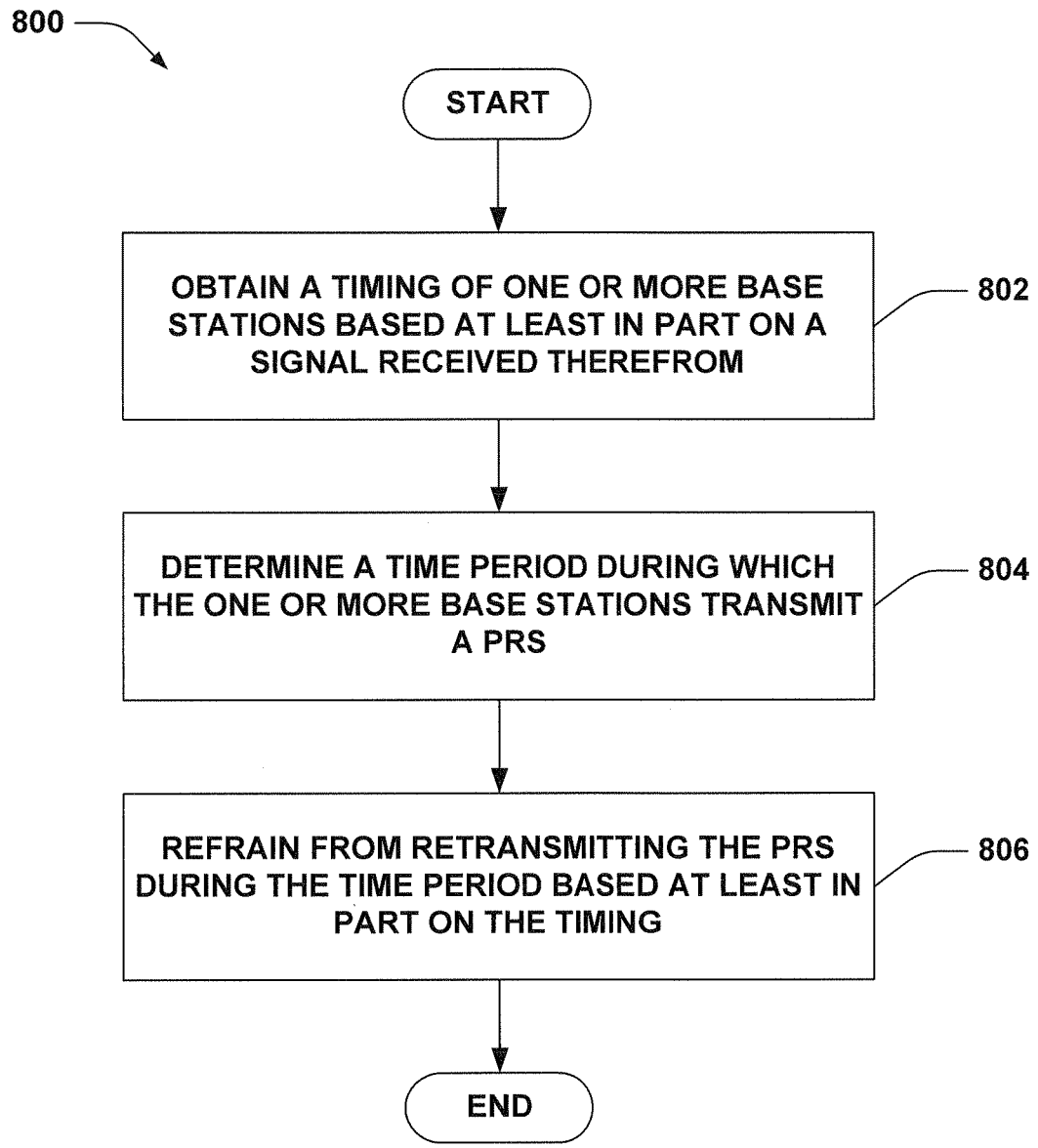
FIG. 8 is a flow chart of an aspect of a methodology for refraining from retransmitting a PRS of a base station.

Referring to FIG. 8, an example methodology 800 that facilitates refraining from retransmitting PRSs is illustrated. At 802, a timing of one or more base stations can be obtained based at least in part on a signal received therefrom. As described, this can be performed using an embedded MSM. At 804, a time period during which the one or more base stations transmit a PRS can be determined. For example, this can be based at least in part on the timing. Additionally or alternatively, the time period can be determined based at least in part on information received from a positioning server for the one or more base stations. At 806, retransmitting the PRS can be refrained from during the time period based at least in part on the timing. As described, this can mitigate confusion for devices that receive and process the PRS.

Figure 9:
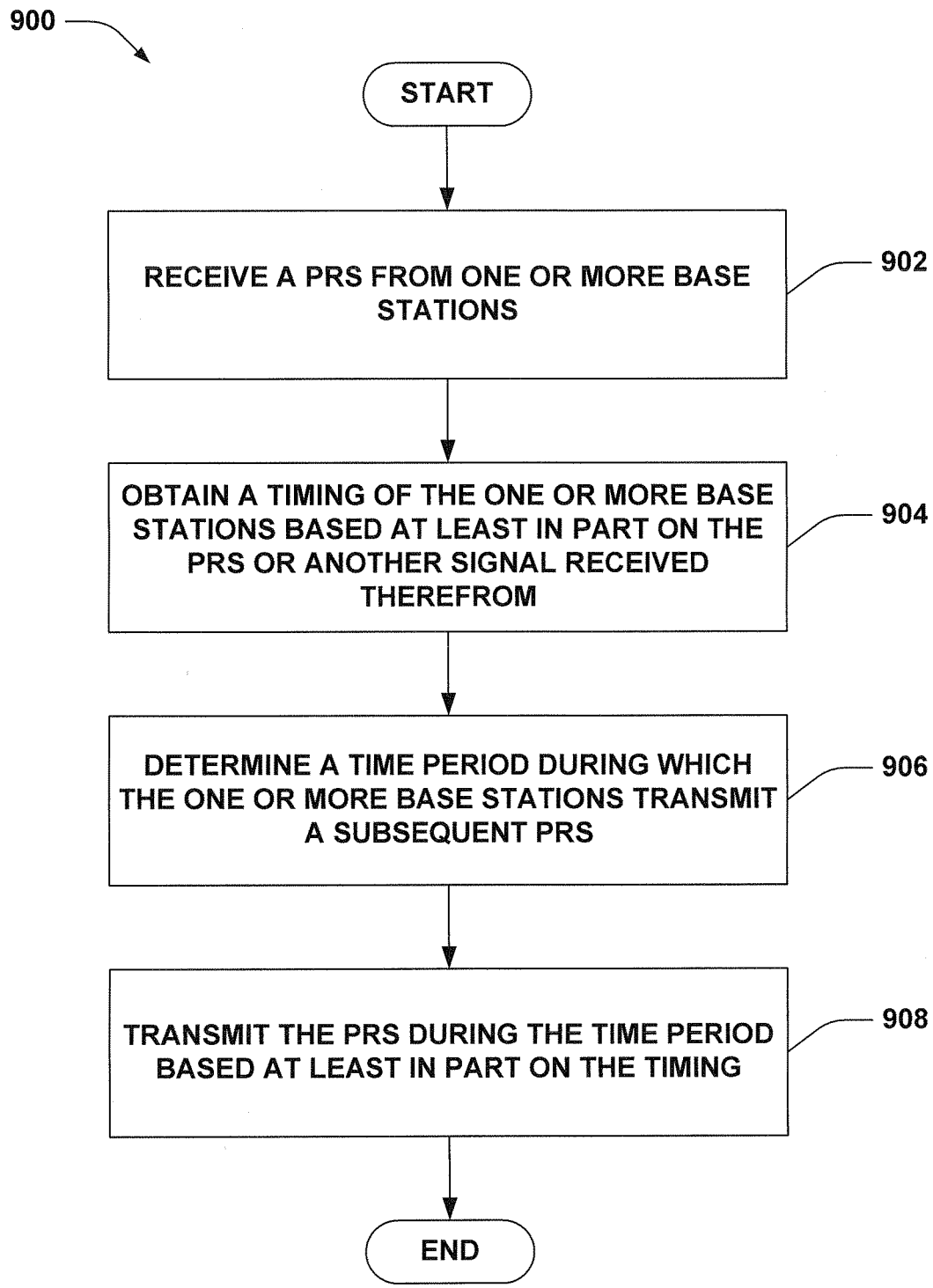
FIG. 9 is a flow chart of an aspect of a methodology for transmitting a PRS based on a timing of a base station.

Now turning to FIG. 9, an example methodology 900 is illustrated for transmitting a PRS. At 902, a PRS can be received from one or more base stations. At 904, a timing of one or more base stations can be obtained based at least in part on the PRS or another signal received therefrom. As described, this can be performed using an embedded MSM. At 906, a time period during which the one or more base stations transmit a subsequent PRS can be determined. For example, this can be based at least in part on the timing. Additionally or alternatively, the time period can be determined based at least in part on information received from a positioning server for the one or more base stations. At 908, the PRS can be transmitted during the time period based at least in part on the timing. Thus, a device can receive the PRS along with the subsequent PRS.

Figure 10:
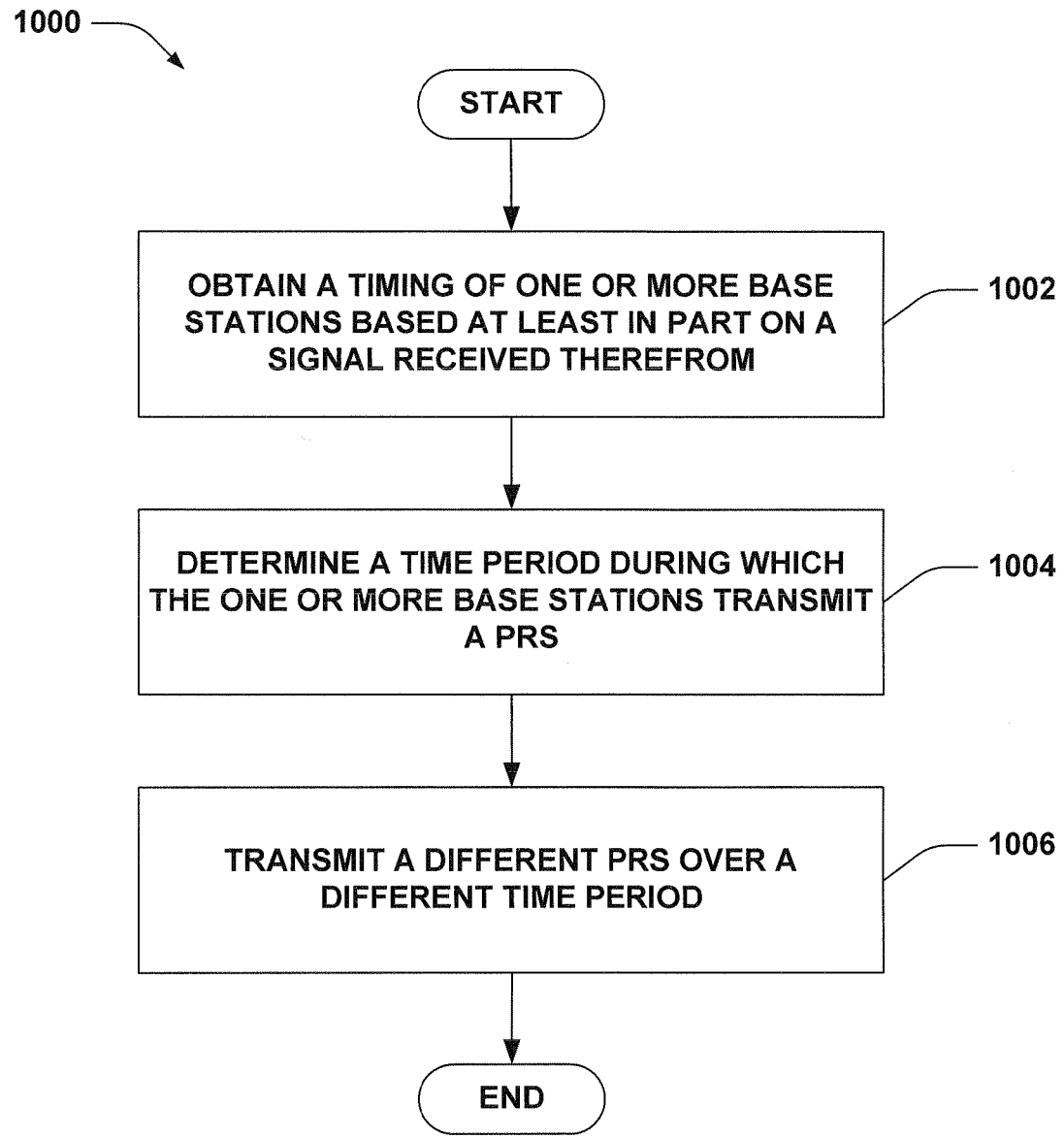
FIG. 10 is a flow chart of an aspect of a methodology for transmitting a different PRS based on a timing of a base station.

In FIG. 10, an example methodology 1000 is shown for transmitting PRSs in a wireless network. At 1002, a timing of one or more base stations can be obtained based at least in part on a signal received therefrom. As described, this can be performed using an embedded MSM. At 1004, a time period during which the one or more base stations transmit a PRS can be determined. For example, this can be based at least in part on the timing. Additionally or alternatively, the time period can be determined based at least in part on information received from a positioning server for the one or more base stations. At 1006, a different PRS can be transmitted over a different time period. Thus, the different PRS does not interfere with the PRS, and a device can at least utilize the different PRS, along with a corresponding location, to perform positioning.

It will be appreciated that, in accordance with one or more aspects described herein, inferences can be made regarding determining a timing of one or more base stations, determining a time period for transmitting a PRS, determining a guard period for switching between receiving and retransmitting uplink and downlink signals, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
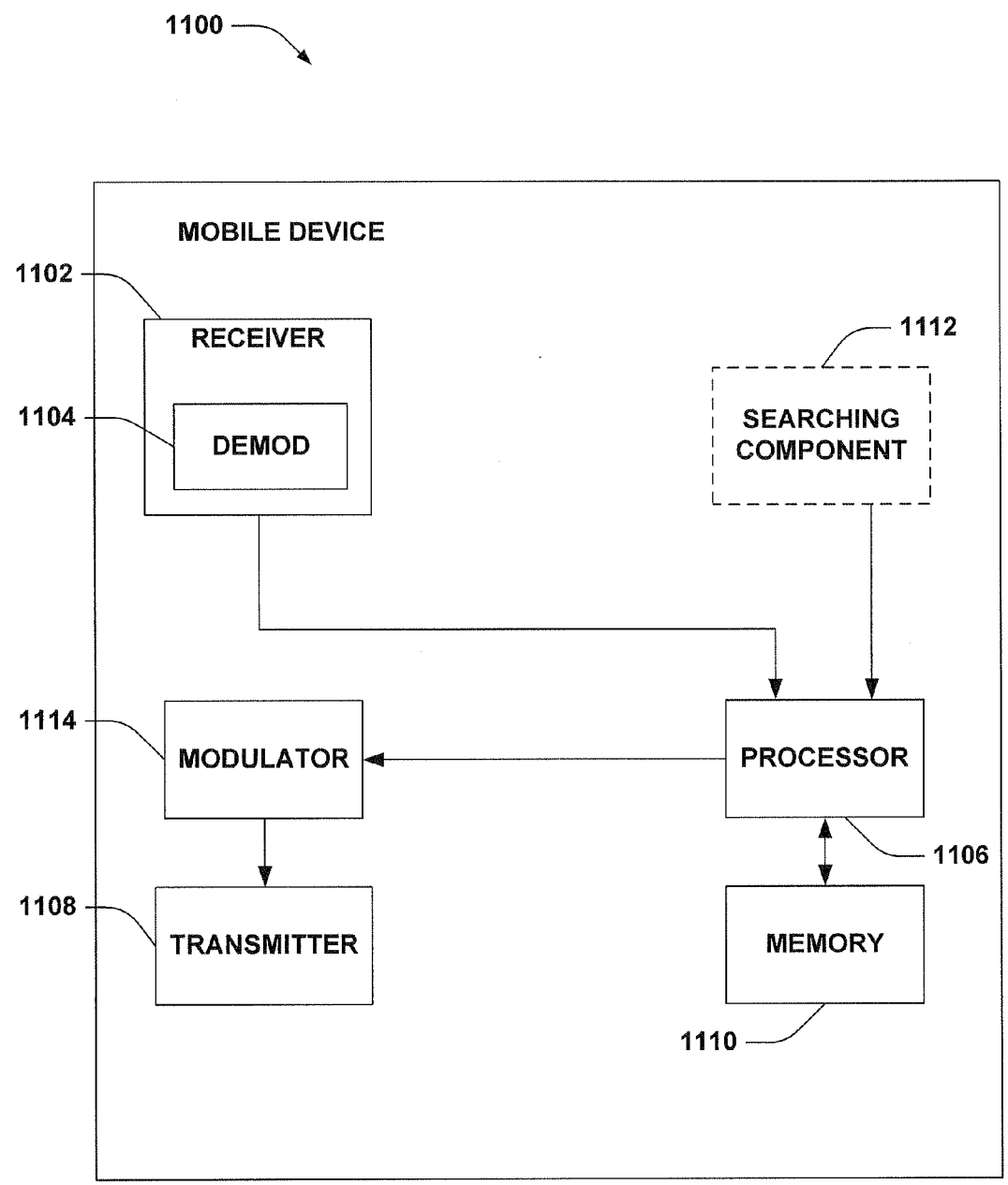
FIG. 11 is a block diagram of an example mobile device that can be provided within a repeater.

FIG. 11 is an illustration of a mobile device 1100 that can communicate in a wireless network. For example, mobile device 1100 can be similar to an MSM employed by or provided within one or more repeaters, such as MSM 112. Mobile device 1100 comprises a receiver 1102 that receives a signal from, for instance, a receive antenna (not shown), performs typical actions on (e.g., filters, amplifies, downconverts, etc.) the received signal, and digitizes the conditioned signal to obtain samples. Receiver 1102 can comprise a demodulator 1104 that can demodulate received symbols and provide them to a processor 1106 for channel estimation. Processor 1106, for example, can be a processor dedicated to analyzing information received by receiver 1102 and/or generating information for transmission by a transmitter 1108, a processor that controls one or more components of mobile device 1100, and/or a processor that analyzes information received by receiver 1102, generates information for transmission by transmitter 1108, and controls one or more components of mobile device 1100.

Mobile device 1100 can additionally comprise memory 1110 that is operatively coupled to processor 1106 and that can store data to be transmitted, received data, information related to available channels, data associated with analyzed signal and/or interference strength, information related to an assigned channel, power, rate, or the like, and any other suitable information for estimating a channel and communicating via the channel. Memory 1110 can additionally store protocols and/or algorithms associated with estimating and/or utilizing a channel (e.g., performance based, capacity based, etc.).

It will be appreciated that the data store (e.g., memory 1110) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1110 of the subject systems and methods is intended to comprise, without being limited to, these and any other suitable types of memory.

Processor 1106 can further be optionally operatively coupled to searching component 1112, which can be similar to searching component 116. Mobile device 1100 can still further comprise a modulator 1114 that modulates signals for transmission by transmitter 1108 to, for instance, a base station, another mobile device, etc. Moreover, for example, mobile device 1100 can comprise multiple transmitters 1108 for multiple network (e.g., radio access network) interfaces. Although depicted as being separate from the processor 1106, it is to be appreciated that the demodulator 1104, searching component 1112, and/or modulator 1114 can be part of the processor 1106 or multiple processors (not shown).

Figure 12:
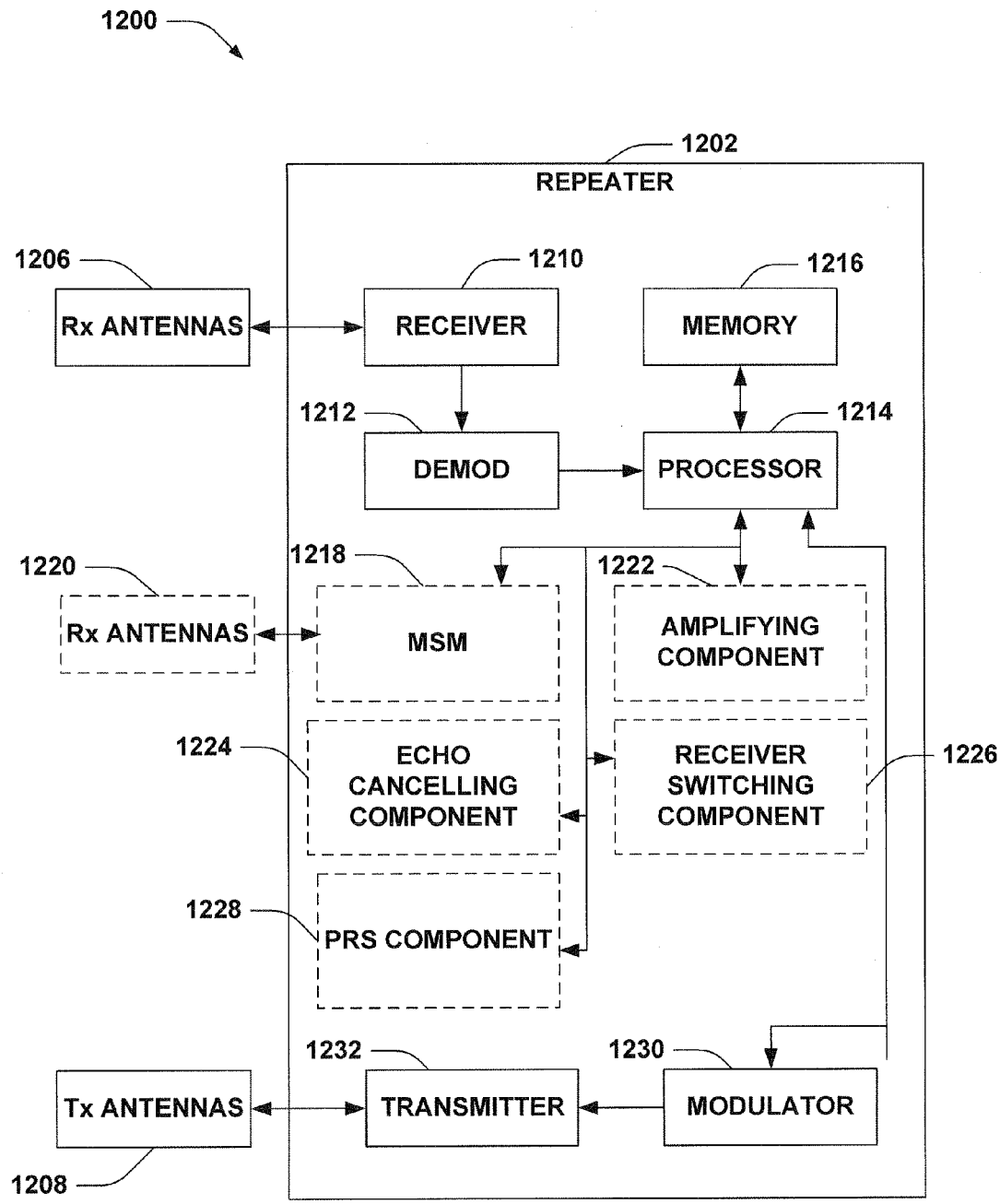
FIG. 12 is a block diagram of an aspect of a system that provides enhanced repeater functionality.

FIG. 12 is an illustration of a system 1200 that facilitates communicating with one or more devices using wireless communications. System 1200 comprises a repeater 1202, which can be similar to repeater 102, having a receiver 1210 that receives signal(s) from one or more base stations, mobile devices, etc., as described, through a plurality of receive antennas 1206 (e.g., which can be of multiple network technologies), and a transmitter 1232 that retransmits to one or more base stations, mobile devices, etc. through a plurality of transmit antennas 1208 (e.g., which can be of multiple network technologies). In addition, in one example, transmitter 1232 can transmit over a wired link. Receiver 1210 can receive information from one or more receive antennas 1206 and is operatively associated with a demodulator 1212 that demodulates received information. In addition, in an example, receiver 1210 can receive from a wired backhaul link. Demodulated symbols are analyzed by a processor 1214 that can be similar to the processor 1106 described above with regard to FIG. 11, and which is coupled to a memory 1216 that can store information related to determining a timing related to the symbols, cancelling echo from the symbols, switching a receiver, transmitting a PRS, and/or any other suitable information related to performing the various actions and functions set forth herein.

Processor 1214 is further optionally coupled to MSM 1218, which can be similar to MSM 112, mobile device 1100, etc. MSM 1218 can include receive antennas 1220 as well, which can optionally receive signals from the base stations or mobile devices for retransmitting, determining a timing, etc., as described. Processor 1214 is also optionally coupled to an amplifying component 1222, which can be similar to amplifying component 110, an echo cancelling component 1224, which can be similar to echo cancelling component 202, a receiver switching component 1226, which can be similar to receiver switching component 204, and/or a PRS component 1228, which can be similar to PRS component 206. In addition, for example, transmitter 1232 can be similar to retransmitting component 114.

Moreover, for example, processor 1214 can modulate signals to be transmitted using modulator 1230, and transmit modulated signals using transmitter 1232. Transmitter 1232 can transmit signals to mobile devices over Tx antennas 1208. Furthermore, although depicted as being separate from the processor 1214, it is to be appreciated that the MSM 1218, amplifying component 1222, echo cancelling component 1224, receiver switching component 1226, PRS component 1228, demodulator 1212, and/or modulator 1230 can be part of the processor 1214 or multiple processors (not shown), and/or stored as instructions in memory 1216 for execution by processor 1214.

Figure 13:
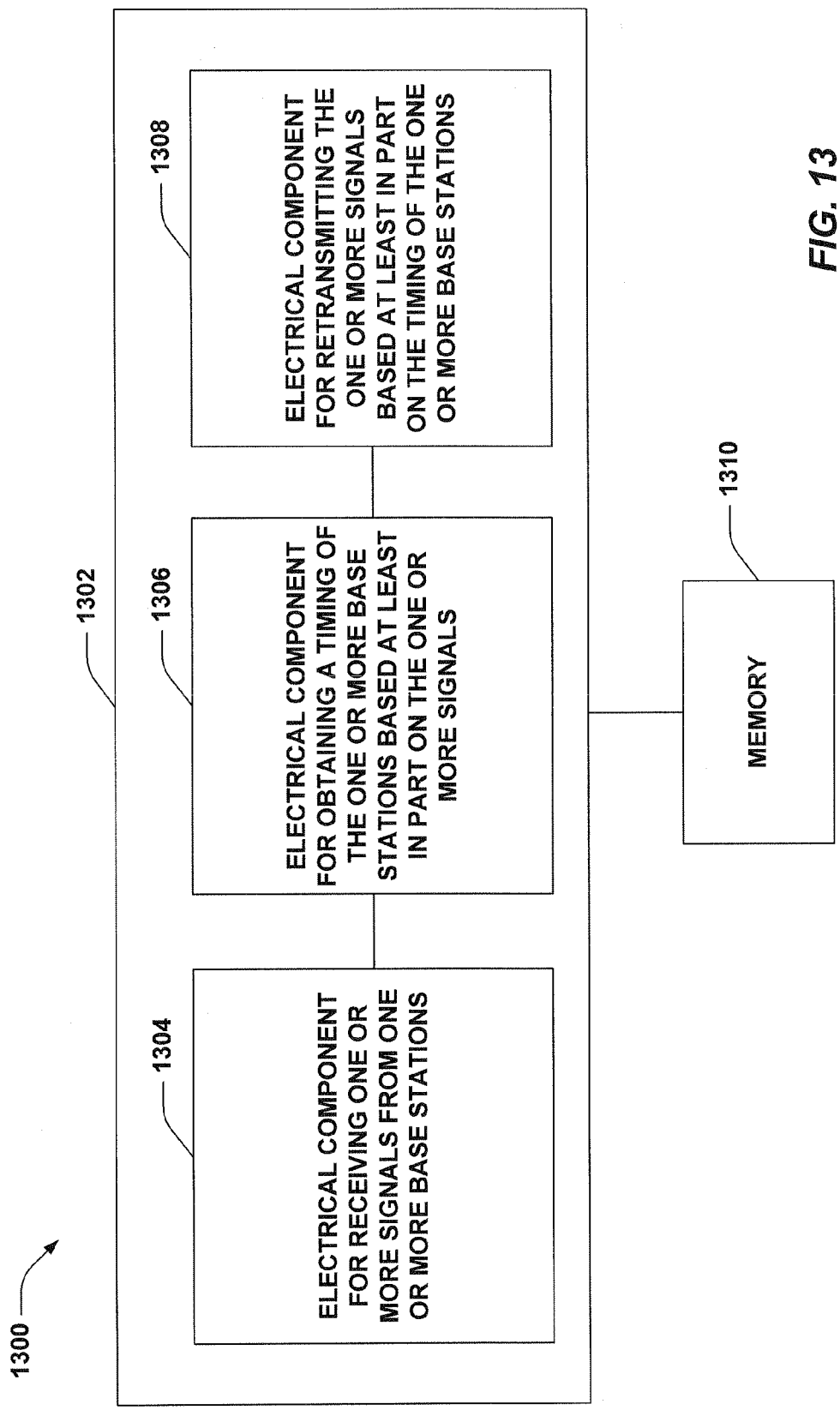
FIG. 13 is a block diagram of an aspect of a system that retransmits signals based on a timing of a base station.

With reference to FIG. 13, illustrated is a system 1300 that retransmits signals according to a timing of a related base station. For example, system 1300 can reside at least partially within a repeater, etc. It is to be appreciated that system 1300 is represented as including functional blocks, which can be functional blocks that represent functions implemented by a processor, software, firmware, or combinations thereof. System 1300 includes a logical grouping 1302 of components (e.g., electrical components) that can act in conjunction. For instance, logical grouping 1302 can include an electrical component for receiving one or more signals from one or more base stations (1304). Further, logical grouping 1302 can comprise an electrical component for obtaining a timing of the one or more base stations based at least in part on the one or more signals (1306). As described, for example, this can include providing the one or more signals to an MSM for determining the timing by estimating a channel, evaluating information blocks in the signal, etc.

In addition, logical grouping 1302 can also comprise an electrical component for retransmitting the one or more signals based at least in part on the timing of the one or more base stations (1308). In an example, this can include cancelling echo from the one or more signals by aligning an FFT block structure based on the timing, switching to receive uplink or downlink signals based on the timing, transmitting a PRS based on the timing, etc. For example, electrical component 1304 can include a receiving component 108 or receiver 1210, as described above. In addition, for example, electrical component 1306, in an aspect, can include a searching component 116, as described above. Moreover, electrical component 1308 can include a retransmitting component 114, transmitter 1232, etc., for example.

Additionally, system 1300 can include a memory 1310 that retains instructions for executing functions associated with the electrical components 1304, 1306, and 1308. While shown as being external to memory 1310, it is to be understood that one or more of the electrical components 1304, 1306, and 1308 can exist within memory 1310. In one example, electrical components 1304, 1306, and 1308 can comprise at least one processor, or each electrical component 1304, 1306, and 1308 can be a corresponding module of at least one processor. Moreover, in an additional or alternative example, components 1304, 1306, and 1308 can be a computer program product comprising a computer readable medium, where each component 1304, 1306, and 1308 can be corresponding code.

Figure 14:
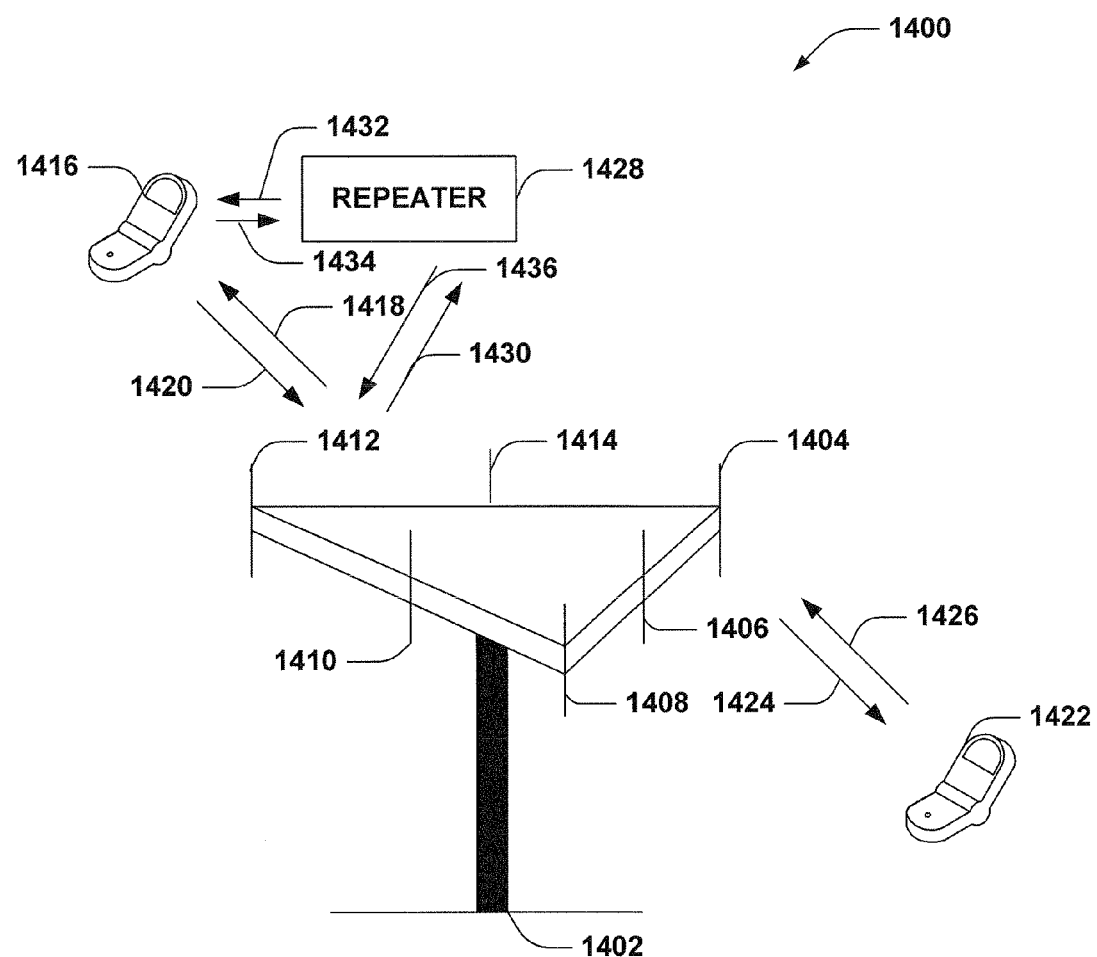
FIG. 14 is a block diagram of an aspect of a wireless communication system in accordance with various aspects set forth herein.

Referring now to FIG. 14, a wireless communication system 1400 is illustrated in accordance with various embodiments presented herein. System 1400 comprises a base station 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1402 can communicate with one or more mobile devices such as mobile device 1416 and mobile device 1422; however, it is to be appreciated that base station 1402 can communicate with substantially any number of mobile devices similar to mobile devices 1416 and 1422. Mobile devices 1416 and 1422 can be, for example, cellular phones, smart phones, laptops, handheld communication devices, handheld computing devices, satellite radios, positioning systems (e.g., GPS), PDAs, tablets, smart books, netbooks, and/or any other suitable device for communicating over wireless communication system 1400. As depicted, mobile device 1416 is in communication with antennas 1412 and 1414, where antennas 1412 and 1414 transmit information to mobile device 1416 over a forward link 1418 and receive information from mobile device 1416 over a reverse link 1420. Moreover, mobile device 1422 is in communication with antennas 1404 and 1406, where antennas 1404 and 1406 transmit information to mobile device 1422 over a forward link 1424 and receive information from mobile device 1422 over a reverse link 1426. In a frequency division duplex (FDD) system, forward link 1418 can utilize a different frequency band than that used by reverse link 1420, and forward link 1424 can employ a different frequency band than that employed by reverse link 1426, for example. Further, in a time division duplex (TDD) system, forward link 1418 and reverse link 1420 can utilize a common frequency band and forward link 1424 and reverse link 1426 can utilize a common frequency band.

Each group of antennas and/or the area in which they are designated to communicate can be referred to as a sector of base station 1402. For example, antenna groups can be designed to communicate to mobile devices in a sector of the areas covered by base station 1402. In communication over forward links 1418 and 1424, the transmitting antennas of base station 1402 can utilize beamforming to improve signal-to-noise ratio of forward links 1418 and 1424 for mobile devices 1416 and 1422. Also, while base station 1402 utilizes beamforming to transmit to mobile devices 1416 and 1422 scattered randomly through an associated coverage area, mobile devices in neighboring cells can be subject to less interference as compared to a base station transmitting through a single antenna to all its mobile devices. Moreover, mobile devices 1416 and 1422 can communicate directly with one another using a peer-to-peer or ad hoc technology. According to an example, system 1400 can be a multiple-input multiple-output (MIMO) communication system.

In addition, system 1400 comprises a repeater 1428 that can facilitate retransmitting signals from base station 1402 to mobile device 1416, and/or vice versa. For example, repeater 1428 can receive signals from base station 1402 over forward link 1430, and can retransmit the signals to mobile device 1416 over forward link 1432. Thus, for example, mobile device 1416 can receive signals related to base station 1402 over forward links 1418 and 1432. For example, repeater 1428 can additionally determine a timing of base station 1402 to enhance repeater functionality as described, such as to cancel echo from signals received over forward link 1430, switch to receive signals from mobile device 1416 over a reverse link, transmit or refrain from retransmitting one or more PRSs, etc. In another example, repeater 1428 can receive signals from mobile device 1416 over reverse link 1434, and can similarly retransmit the signals to base station 1402 over reverse link 1436.

Figure 15:
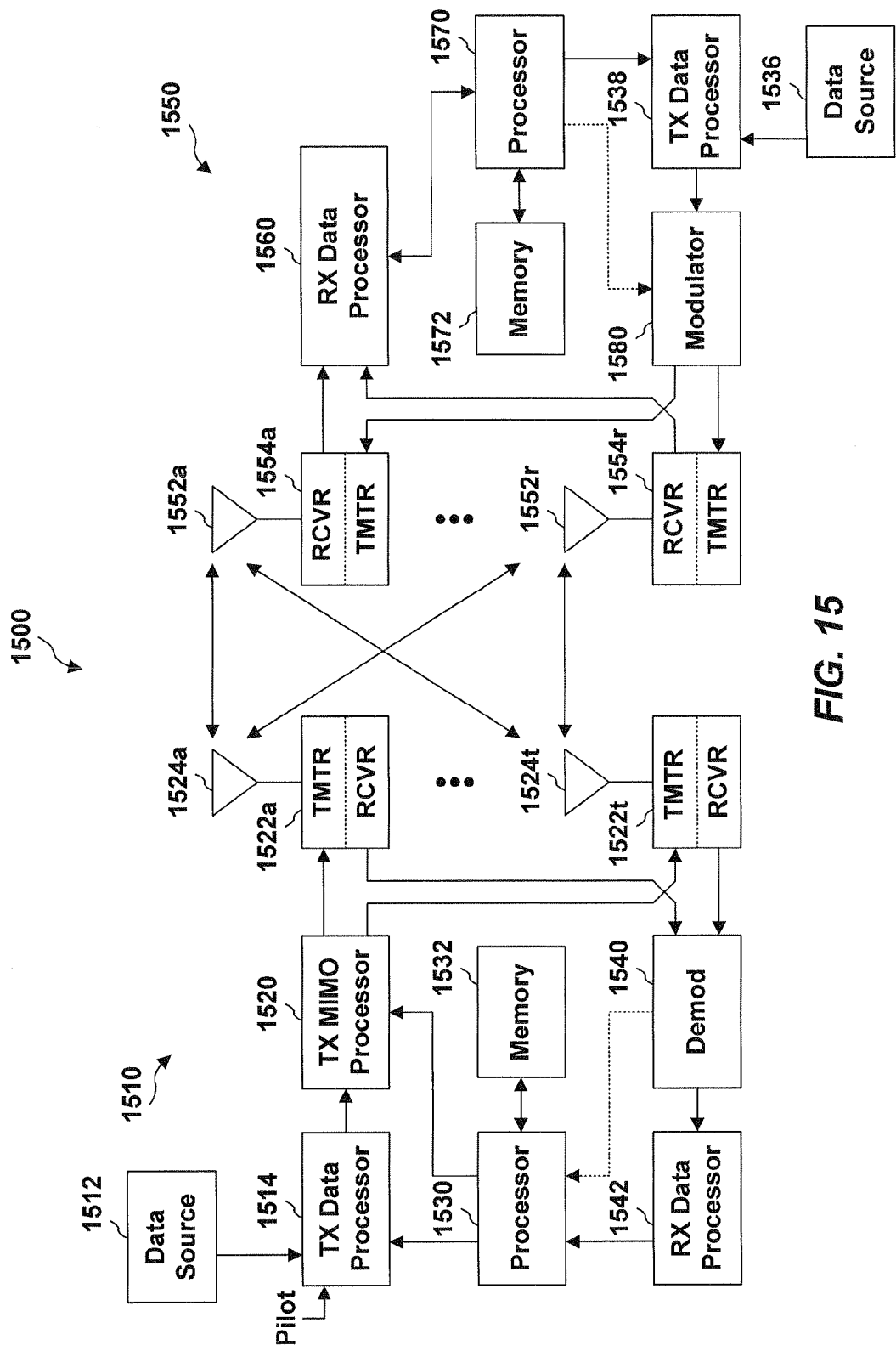
FIG. 15 is a schematic block diagram of an aspect of a wireless network environment that can be employed in conjunction with the various systems and methods described herein.

FIG. 15 shows an example wireless communication system 1500. The wireless communication system 1500 depicts one base station or mobile device 1510 and one repeater 1550 for sake of brevity. However, it is to be appreciated that system 1500 can include more than one base station, mobile device, repeater, etc., wherein additional base stations, mobile devices, and/or repeaters can be substantially similar or different from example base station or mobile device 1510 and repeater 1550 described below. In addition, it is to be appreciated that base station or mobile device 1510 and/or repeater 1550 can employ the systems (FIGS. 1-2 and 12-14), transmission timelines (FIGS. 3-4), methods (FIGS. 5-10), and/or mobile devices (FIG. 11) described herein to facilitate wireless communication there between. For example, components or functions of the systems and/or methods described herein can be part of a memory 1532 and/or 1572 or processors 1530 and/or 1570 described below, and/or can be executed by processors 1530 and/or 1570 to perform the disclosed functions.

At base station or mobile device 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using various techniques such as, e.g., orthogonal frequency division multiplexing (OFDM). For example, the pilot symbols can be frequency division multiplexed (FDM), time division multiplexed (TDM), or code division multiplexed (CDM). The pilot data is typically a known data pattern that is processed in a known manner and can be used at repeater 1550 to estimate channel response. In one example, repeater 1550 can additionally comprise a MSM to estimate the channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At repeater 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and down-converts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station or mobile device 1510. TX data processor 1538 can retransmit the detected symbol streams as received, one or more other data streams from a data source 1536, etc. For example, modulator 1580 can modulate the symbol steams, which transmitters 1554a through 1554r can condition and retransmit.

In another example, the base station or mobile device 1510 can receive retransmissions from repeater 1550. In this example, the modulated signals from repeater 1550 are received by antennas 1524, conditioned by receivers 1522, demodulated by a demodulator 1540, and processed by a RX data processor 1542 to extract the retransmitted message from repeater 1550. Further, processor 1530 can process the extracted message to determine which precoding matrix to use for determining beamforming weights.

Processors 1530 and 1570 can direct (e.g., control, coordinate, manage, etc.) operation at base station or mobile device 1510 and repeater 1550, respectively. Respective processors 1530 and 1570 can be associated with memory 1532 and 1572 that store program codes and data. Processors 1530 and 1570 can also determine a timing of base station or mobile device 1510, as described, for performing retransmitting, cancelling echo, switching between receiving and retransmitting uplink and downlink signals, transmitting PRSs, and/or the like.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communication, comprising:
receiving, at a repeater used to expand base station coverage, one or more signals transmitted from one or more base stations;
obtaining a timing of the one or more base stations based at least in part on the one or more signals;
retransmitting, from the repeater, the one or more signals based at least in part on the timing of the one or more base stations; and
cancelling, by the repeater, an echo from the one or more signals based at least in part on the timing of the one or more base stations, wherein the cancelling of the echo includes cancelling, from the one or more signals, a previous signal retransmitted by the repeater at a time the one or more signals are received from the one or more base stations at the repeater.

2. The method of claim 1, further comprising aligning a fast Fourier transform block structure with the one or more signals according to the timing of the one or more base stations, wherein the cancelling the echo from the one or more signals is based at least in part on the aligning the fast Fourier transform block structure.

3. The method of claim 2, further comprising determining a cyclic prefix of the one or more signals based at least in part on one or more information blocks of the one or more signals, wherein the cancelling the echo is further based at least in part on removing the cyclic prefix from the one or more signals.

4. The method of claim 1, further comprising:
determining a time period of a downlink transmission from the one or more base stations based at least in part on the timing of the one or more base stations; and
amplifying the one or more signals, wherein the receiving the one or more signals includes receiving the one or more signals during the time period.

5. The method of claim 4, further comprising:
determining a different time period of a uplink transmission from one or more devices to the one or more base stations based at least in part on the timing of the one or more base stations; and
switching, during a guard period, to amplify and retransmit uplink signals received from the one or more devices during the different time period.

6. The method of claim 1, further comprising determining a time period over which the one or more base stations transmit a positioning reference signal based at least in part on the timing of the one or more base stations.

7. The method of claim 6, further comprising refraining from retransmitting the positioning reference signal received over the time period.

8. The method of claim 7, further comprising transmitting a different positioning reference signal in a different time period based at least in part on the timing of the one or more base stations.

9. The method of claim 6, further comprising transmitting a previously received positioning reference signal in the time period based at least in part on the timing of the one or more base stations.

10. The method of claim 1, wherein the obtaining the timing of the one or more base stations comprises amplifying the one or more signals and utilizing an embedded mobile station modem (MSM) to process the one or more signals as amplified.

11. The method of claim 10, wherein the obtaining the timing of the one or more base stations includes utilizing the embedded MSM to determine one or more parameters related to the one or more base stations based at least in part on the one or more signals as amplified.

12. The method of claim 10, further comprising approximating the timing of the one or more base stations based at least in part on receiving one or more different signals from the one or more base stations via the MSM, wherein the obtaining the timing of the one or more base stations comprises correcting the timing of the one or more base stations according to one or more timing advance commands received from the one or more base stations.

13. The method of claim 1, further comprising ceasing signal transmission during one or more time periods over which the one or more signals are received, wherein the obtaining the timing of the one or more base stations comprises utilizing an embedded mobile station modem to receive and process the one or more signals.

14. An apparatus for utilizing base station timing for retransmitting signals, comprising:
at least one processor configured to:
receive, at a repeater used to expand base station coverage, one or more signals from one or more base stations;
determine a timing of the one or more base stations based at least in part on the one or more signals;
retransmit, from the repeater, the one or more signals based at least in part on the timing of the one or more base stations; and
cancel, at the repeater, an echo from one or more signals based at least in part on the timing of the one or more base stations, wherein the cancelling of the echo includes cancelling, from the one or more signals, a previous signal retransmitted by the repeater at a time the one or more signals are received from the one or more base stations; and
a memory coupled to the at least one processor.

15. The apparatus of claim 14, wherein the at least one processor is further configured to align a fast Fourier transform block structure with the one or more signals according to the timing of the one or more base stations to cancel the echo from the one or more signals.

16. The apparatus of claim 15, wherein the at least one processor is further configured to determine a cyclic prefix of the one or more signals based at least in part on one or more information blocks of the one or more signals, and remove the cyclic prefix from the one or more signals to facilitate cancelling the echo.

17. The apparatus of claim 14, wherein the at least one processor is further configured to:
determine a time period of a downlink transmission from the one or more base stations based at least in part on the timing of the one or more base stations; and
amplify the one or more signals, wherein the at least one processor receives the one or more signals during the time period.

18. The apparatus of claim 17, wherein the at least one processor is further configured to:
determine a different time period of a uplink transmission from one or more devices to the one or more base stations based at least in part on the timing of the one or more base stations; and
switch, during a guard period, to amplify and retransmit uplink signals received from the one or more devices during the different time period.

19. The apparatus of claim 14, wherein the at least one processor is further configured to determine a time period over which the one or more base stations transmit a positioning reference signal based at least in part on the timing of the one or more base stations.

20. The apparatus of claim 19, wherein the at least one processor is further configured to refrain from transmitting the positioning reference signal.

21. The apparatus of claim 20, wherein the at least one processor is further configured to transmit a different positioning reference signal in a different time period based at least in part on the timing of the one or more base stations.

22. The apparatus of claim 19, wherein the at least one processor is further configured to transmit a previously received reference signal in the time period based at least in part on the timing of the one or more base stations.

23. The apparatus of claim 14, wherein the at least one processor determines the timing of the one or more base stations at least in part amplifying the one or more signals and utilizing an embedded mobile station modem (MSM) to process the one or more signals as amplified.

24. The apparatus of claim 23, wherein the at least one processor determines the timing of the one or more base stations at least in part by utilizing the embedded MSM to determine one or more parameters related to the one or more base stations based at least in part on the one or more signals as amplified.

25. The apparatus of claim 23, wherein the at least one processor is further configured to approximate the timing of the one or more base stations based at least in part on receiving one or more different signals from the one or more base stations via the MSM, wherein the at least one processor determines the timing of the one or more base stations at least in part by correcting timing of the one or more base stations according to one or more timing advance commands received from the one or more base stations.

26. The apparatus of claim 14, wherein the at least one processor is further configured to ceasing signal transmission during one or more time periods over which the one or more signals are received, wherein the at least one processor determines the timing of the one or more base stations at least in part by utilizing an embedded mobile station modem to receive and process the one or more signals.

27. An apparatus for retransmitting signals based on base station timing, comprising:
 means for receiving, at a repeater used to expand base station coverage, one or more signals from one or more base stations;
 means for obtaining a timing of the one or more base stations based at least in part on the one or more signals;
 means for retransmitting, from the repeater, the one or more signals based at least in part on the timing of the one or more base stations; and
 means for cancelling, at the repeater, an echo from one or more signals based at least in part on the timing of the one or more base stations, wherein the cancelling of the echo includes cancelling, from the one or more signals, a previous signal retransmitted by the repeater at a time the one or more signals are received from the one or more base stations.

28. The apparatus of claim 27, wherein the means for cancelling cancels the echo based at least in part on aligning a fast Fourier transform block structure with the one or more signals according to the timing of the one or more base stations.

29. The apparatus of claim 28, wherein the means for cancelling determines a cyclic prefix of the one or more signals based at least in part on one or more information blocks of the one or more signals, and wherein the means for cancelling cancels the echo based at least in part on removing the cyclic prefix from the one or more signals.

30. The apparatus of claim 27, wherein the means for obtaining further determines a time period of a downlink transmission from the one or more base stations based at least in part on the timing of the one or more base stations, and further comprising means for amplifying the one or more signals, wherein the means for receiving receives the one or more signals during the time period.

31. The apparatus of claim 30, wherein the means for obtaining further determines a different time period of a uplink transmission from one or more devices to the one or more base stations based at least in part on the timing of the one or more base stations, and further comprising means for switching at least one of the means for receiving, the means for amplifying, and the means for retransmitting, during a guard period, for uplink signals transmitted by the one or more devices during the different time period.

32. The apparatus of claim 27, further comprising means for determining a time period over which the one or more base stations transmit a positioning reference signal based at least in part on the timing of the one or more base stations.

33. The apparatus of claim 32, wherein the means for retransmitting refrains from retransmitting the positioning reference signal received over the time period.

34. The apparatus of claim 33, wherein the means for retransmitting transmits a different positioning reference signal in a different time period based at least in part on the timing of the one or more base stations.

35. The apparatus of claim 32, wherein the means for retransmitting transmits a previously received positioning reference signal in the time period based at least in part on the timing of the one or more base stations.

36. The apparatus of claim 27, further comprising means for amplifying the one or more signals, wherein the means for obtaining the timing of the one or more base stations is part of an embedded mobile station modem (MSM) that processes the one or more signals as amplified.

37. The apparatus of claim 36, wherein the embedded MSM determines one or more parameters related to the one or more base stations based at least in part on the one or more signals as amplified.

38. The apparatus of claim 36, wherein the means for obtaining approximates the timing of the one or more base stations based at least in part on receiving one or more different signals from the one or more base stations via the MSM, and wherein the means for obtaining the timing of the one or more base stations corrects the timing of the one or more base stations according to one or more timing advance commands received from the one or more base stations.

39. The apparatus of claim 27, wherein the means for retransmitting ceases signal transmission during one or more time periods over which the one or more signals are received, wherein the means for obtaining the timing of the one or more base stations is part of an embedded mobile station modem that receives and processes the one or more signals.

40. A computer program product for utilizing base station timing for retransmitting signals, comprising:
 a non-transitory computer-readable medium, comprising:
 code for causing at least one computer to receive, at a repeater used to expand base station coverage, one or more signals from one or more base stations;
 code for causing the at least one computer to determine a timing of the one or more base stations based at least in part on the one or more signals;

code for causing the at least one computer to retransmit, from the repeater, the one or more signals based at least in part on the timing of the one or more base stations; and code for causing the at least one computer to cancel, at the repeater, an echo from one or more signals based at least in part on the timing of the one or more base stations, wherein the cancelling of the echo includes cancelling, from the one or more signals, a previous signal retransmitted by the repeater at a time the one or more signals are received from the one or more base stations.

41. The computer program product of claim 40, wherein the computer-readable medium further comprises code for causing the at least one computer to align a fast Fourier transform block structure with the one or more signals according to the timing of the one or more base stations to cancel the echo from the one or more signals.

42. The computer program product of claim 41, wherein the computer-readable medium further comprises code for causing the at least one computer to determine a cyclic prefix of the one or more signals based at least in part on one or more information blocks of the one or more signals, and remove the cyclic prefix from the one or more signals to facilitate cancelling the echo.

43. The computer program product of claim 40, wherein the computer-readable medium further comprises:

code for causing the at least one computer to determine a time period of a downlink transmission from the one or more base stations based at least in part on the timing of the one or more base stations; and code for causing the at least one computer to amplify the one or more signals, wherein the code for causing the at least one computer to receive receives the one or more signals during the time period.

44. The computer program product of claim 43, wherein the computer-readable medium further comprises:

code for causing the at least one computer to determine a different time period of a uplink transmission from one or more devices to the one or more base stations based at least in part on the timing of the one or more base stations; and code for causing the at least one computer to switch, during a guard period, to amplify and retransmit uplink signals received from the one or more devices during the different time period.

45. The computer program product of claim 40, wherein the computer-readable medium further comprises code for causing the at least one computer to determine a time period over which the one or more base stations transmit a positioning reference signal used at least in part on the timing of the one or more base stations.

46. The computer program product of claim 45, wherein the computer-readable medium further comprises code for causing the at least one computer to refrain from transmitting the positioning reference signal.

47. The computer program product of claim 46, wherein the computer-readable medium further comprises code for causing the at least one computer to transmit a different positioning reference signal in a different time period based at least in part on the timing of the one or more base stations.

48. The computer program product of claim 45, wherein the computer-readable medium further comprises code for causing the at least one computer to transmit a previously received reference signal in the time period based at least in part on the timing of the one or more base stations.

49. The computer program product of claim 40, wherein the code for causing the at least one computer to determine determines the timing of the one or more base stations at least in part amplifying the one or more signals and utilizing an embedded mobile station modem (MSM) to process the one or more signals as amplified.

50. The computer program product of claim 49, wherein the code for causing the at least one computer to determine determines the timing of the one or more base stations at least in part by utilizing the embedded MSM to determine one or more parameters related to the one or more base stations based at least in part on the one or more signals as amplified.

51. The computer program product of claim 49, wherein the computer-readable medium further comprises code for causing the at least one computer to approximate the timing of the one or more base stations based at least in part on receiving one or more different signals from the one or more base stations via the MSM, wherein the code for causing the at least one computer to determine determines the timing of the one or more base stations at least in part by correcting timing of the one or more base stations according to one or more timing advance commands received from the one or more base stations.

52. The computer program product of claim 40, wherein the computer-readable medium further comprises code for causing the at least one computer to cease signal transmission during one or more time periods over which the one or more signals are obtained, wherein the code for causing the at least one computer to determine determines the timing of the one or more base stations at least in part by utilizing an embedded mobile station modem to receive and process the one or more signals.

53. An apparatus for retransmitting signals based on base station timing, comprising:

a receiving component for receiving one or more signals, at a repeater used to expand base station coverage, from one or more base stations;

a searching component for obtaining a timing of the one or more base stations based at least in part on the one or more signals;

a retransmitting component for retransmitting, from the repeater, the one or more signals based at least in part on the timing of the one or more base stations; and an echo cancelling component for cancelling an echo from one or more signals based at least in part on the timing of the one or more base stations, wherein the cancelling of the echo includes cancelling, from the one or more signals, a previous signal retransmitted by the repeater at a time the one or more signals are received from the one or more base stations.

54. The apparatus of claim 53, wherein the echo cancelling component cancels the echo based at least in part on aligning a fast Fourier transform block structure with the one or more signals according to the timing of the one or more base stations.

55. The apparatus of claim 54, wherein the echo cancelling component determines a cyclic prefix of the one or more signals based at least in part on one or more information blocks of the one or more signals, and wherein the echo cancelling component cancels the echo based at least in part on removing the cyclic prefix of the one or more signals.

56. The apparatus of claim 53, wherein the searching component further determines a time period of a downlink transmission from the one or more base stations based at least in part on the timing of the one or more base stations, and further comprising an amplifying component for amplifying the one or more signals, wherein the receiving component receives the one or more signals during the time period.

57. The apparatus of claim 56, wherein the searching component further determines a different time period of a uplink transmission from one or more devices to the one or more base stations based at least in part on the timing of the one or more base stations, and further comprising a receiver switching component for switching at least one of the receiving component, the amplifying component, and the retransmitting component, during a guard period, for uplink signals transmitted by the one or more devices during the different time period.

58. The apparatus of claim 53, further comprising a positioning reference signal component for determining a time period over which the one or more base stations transmit a positioning reference signal based at least in part on the timing of the one or more base stations.

59. The apparatus of claim 58, wherein the retransmitting component refrains from retransmitting the positioning reference signal received over the time period.

60. The apparatus of claim 59, wherein the retransmitting component transmits a different positioning reference signal in a different time period based at least in part on the timing of the one or more base stations.

61. The apparatus of claim 58, wherein the retransmitting component transmits a previously received positioning reference signal in the time period based at least in part on the timing of the one or more base stations.

62. The apparatus of claim 53, further comprising an amplifying component for amplifying the one or more signals, wherein the searching component is part of an embedded mobile station modem (MSM) that processes the one or more signals as amplified.

63. The apparatus of claim 62, wherein the embedded MSM determines one or more parameters related to the one or more base stations based at least in part on the one or more signals as amplified.

64. The apparatus of claim 62, wherein the searching component approximates the timing of the one or more base stations based at least in part on receiving one or more different signals from the one or more base stations via the MSM, and wherein the searching component corrects the timing of the one or more base stations according to one or more timing advance commands received from the one or more base stations.

65. The apparatus of claim 53, wherein the retransmitting component ceases signal transmission during one or more time periods over which the one or more signals are received, wherein the searching component is part of an embedded mobile station modem that receives and processes the one or more signals.

* * * * *